(12) United States Patent
Park et al.

(10) Patent No.: US 7,307,971 B2
(45) Date of Patent: Dec. 11, 2007

(54) SOFT HANDOVER METHOD FOR MULTIMEDIA BROADCAST/MULTICAST SERVICE IN A CDMA MOBILE COMMUNICATION SYSTEM

(75) Inventors: Joon-Goo Park, Seoul (KR); Sung-Ho Choi, Songnam-shi (KR); Jin-Weon Chang, Yongin-shi (KR); Kook-Heui Lee, Yongin-shi (KR); Soeng-Hun Kim, Suwon-shi (KR); Ju-Ho Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 965 days.

(21) Appl. No.: 10/423,636

(22) Filed: Apr. 25, 2003

(65) Prior Publication Data

US 2004/0008646 A1 Jan. 15, 2004

(30) Foreign Application Priority Data

Apr. 27, 2002 (KR) .................... 10-2002-0023283

(51) Int. Cl.
*H04Q 7/00* (2006.01)
*H04Q 7/20* (2006.01)
*H04J 3/06* (2006.01)

(52) U.S. Cl. .................... 370/331; 370/350; 370/503; 455/436

(58) Field of Classification Search .............. 370/331, 370/335, 342, 350, 503
See application file for complete search history.

(56) References Cited

U.S. PATENT DOCUMENTS 5,481,258 A 1/1996 Fawcett et al.

| 6,768,903 | B2* | 7/2004 | Fauconnier et al. | 455/403 |
|---|---|---|---|---|
| 6,956,829 | B2* | 10/2005 | Lee et al. | 370/280 |
| 7,031,277 | B2* | 4/2006 | Choi et al. | 370/331 |
| 2002/0025820 | A1* | 2/2002 | Fauconnier et al. | 455/452 |
| 2003/0007470 | A1* | 1/2003 | Grilli et al. | 370/335 |
| 2004/0053614 | A1* | 3/2004 | Il-Gyu et al. | 455/436 |
| 2005/0117547 | A1* | 6/2005 | Lu | 370/335 |

FOREIGN PATENT DOCUMENTS

| GB | 2 001 230 | 6/1978 |
|---|---|---|
| JP | 11-18144 | 1/1999 |
| JP | 2001-148880 | 5/2001 |
| JP | 2002-27523 | 1/2002 |
| WO | WO 99/08463 | 2/1999 |
| WO | WO 02/32184 | 4/2002 |

OTHER PUBLICATIONS

GB Search Report dated Oct. 3, 2003 issued in a counterpart application, namely, Appln. No. GB0309262.4.

* cited by examiner

*Primary Examiner*—Huy D. Vu
*Assistant Examiner*—Nittaya Juntima
(74) *Attorney, Agent, or Firm*—The Farrell Law Firm

(57) ABSTRACT

A method for providing soft handover in a code division multiple access mobile communication system supporting multicast multimedia broadcast service. In an asynchronous mobile communication system supporting an MBMS service, when a UE moves to a region where it can receive data from a plurality of Node Bs, soft handover is performed on the UE. Thus, even though an MBMS user moves from an existing cell to a new cell, a stable MBMS service is provided. Furthermore, the UE can soft-combine data received from a plurality of Node Bs.

26 Claims, 13 Drawing Sheets

SOFT HANDOVER METHOD FOR MULTIMEDIA BROADCAST/MULTICAST SERVICE IN A CDMA MOBILE COMMUNICATION SYSTEM

PRIORITY

This application claims priority under 35 U.S.C. § 119 to an application entitled "Soft Handover Method for Multimedia Broadcast/Multicast Service in a CDMA Mobile Communication System" filed in the Korean Intellectual Property Office on Apr. 27, 2002 and assigned Serial No. 2002-23283, the contents of which are incorporated herein by reference.

BACKGROUND OF THE INVENTION

1. Field of the Invention

The present invention relates generally to soft handover in a code division multiple access (CDMA) mobile communication system, and in particular, to soft handover in a multimedia broadcast/multicast service.

2. Description of the Related Art

Currently, due to the development of the communication industry, a service provided by a code division multiple access (hereinafter referred to as "CDMA") mobile communication system is being developed to include multicasting multimedia communication that transmits not only voice service data but also high-capacity data such as packet data and circuit data. In order to support the multicasting multimedia communication, a broadcast/multicast service has been proposed in which one data source provides a service to a plurality of user equipments (hereinafter referred to as "UE"). The broadcast/multicast service can be divided into a cell broadcast service (hereinafter referred to as "CBS"), i.e., a message-based service, and a multimedia broadcast/multicast service (hereinafter referred to as "MBMS") that supports multimedia data, such as real-time image and voice, still image, and text.

The CBS is a service for broadcasting a plurality of messages to all UEs located in a particular service area. The particular service area where the CBS is provided can be an entire cell area where the CBS is provided. The MBMS is a service for simultaneously providing voice data and image data, and requires many transmission resources. The MBMS is serviced over a broadcast channel, since a plurality of services can possibly be provided at the same time within one cell.

Generally, in an asynchronous mobile communication system, timing synchronization between Node Bs is not provided fundamentally. That is, as the Node Bs have their own independent timers, reference times of the Node Bs can be different from one another. A unit of the timer is called a Node B frame number (BFN). Each Node B can include a plurality of cells, and each cell has a timer that advances at regular intervals from the BFN. A unit of the timer given to each cell is called a system frame number (SFN). One SFN has a length of 10 ms, and the SFN has a value of 0 to 4095. One SFN is comprised of 38400 chips, and one chip has a length of 10 ms/38400.

Therefore, when a radio network controller (hereinafter referred to as "RNC") transmits MBMS data to Node Bs, if there is no separate synchronization process among the Node Bs (or cells), the respective Node Bs (or cells) will transmit the MBMS data at different times. This means that when a UE moves to a new cell (or Node B), it cannot receive the existing service.

Obviously, a UE roams from one cell area to another cell area rather than staying in one cell area. At this point, a common voice service is continued through soft handover. However, soft handover for the MBMS service has never been defined. Therefore, if a UE that was receiving an MBMS service from a particular Node B in a specific cell area moves to another cell area, the UE cannot continue to receive MBMS data, and must again perform an initialization operation for MBMS in order to receive the MBMS service from a new cell (or Node B).

SUMMARY OF THE INVENTION

It is, therefore, an object of the present invention to provide a soft handover method for a user equipment (UE) that is receiving a multimedia broadcast/multicast service (MBMS) in a code division multiple access (CDMA) mobile communication system.

It is another object of the present invention to provide a method for synchronizing data transmission timing between Node Bs managed by the same radio network controller (RNC), thereby enabling soft handover between cells that support an MBMS service.

It is further another object of the present invention to provide a method for minimizing a data transmission time difference among cells that support an MBMS service.

It is yet another object of the present invention to provide a method for minimizing a data transmission time difference among cells that support an MBMS service so as to perform a soft handover without extending capacity of a buffer included in a UE.

It is still another object of the present invention to provide a method for determining a data transmission time among cells so that a UE can soft-combine data from a plurality of cells that support an MBMS service.

It is still another object of the present invention to provide a method for enabling a UE that supports an MBMS service to receive data from different Node Bs with minimum time difference.

In accordance with a first aspect of the present invention, there is provided a method for transmitting broadcast data from neighboring Node Bs to one of a plurality of user equipments (UEs) when the UE moves to a handover region between the neighboring Node Bs, in a code division multiple access (CDMA) mobile communication system having at least two neighboring Node Bs, a radio network controller (RNC) connected to the Node Bs, and the UEs located in cells occupied by corresponding Node Bs, wherein the Node Bs transmit data asynchronously and transmit common broadcast data to the UEs within the Node Bs. The method comprises transmitting a first difference between a transmission start point of a first system frame form a first Node B out of the neighboring Node Bs and a reception start point of a second system frame corresponding to the first system frame, received from a second Node B out of the neighboring Node Bs, from the first Node B to the RNC; transmitting a second difference between a transmission start point of the second system frame from the second Node B and a reception start point of the first system frame corresponding to the second system frame, received from the first Node B, from the second Node B to the RNC; and calculating a difference between transmission start points of the first and second system frames from the first and second differences, wherein each start point of the frames of the broadcast data transmitted from the first Node B informs the first and second Node Bs of a transmission time point of the frames of the broadcast data.

In accordance with a second aspect of the present invention, there is provided a method for transmitting broadcast data from neighboring Node Bs to one of a plurality of user equipments (UEs) when the UE moves to a handover region between the neighboring Node Bs, in a code division multiple access (CDMA) mobile communication system having at least two neighboring Node Bs, a radio network controller (RNC) connected to the Node Bs, and the UEs located in cells occupied by corresponding Node Bs, wherein the Node Bs transmit data asynchronously and transmit common broadcast data to the UEs within the Node Bs. The method comprises transmitting a difference between a transmission start point of a first system frame from the first Node B of the neighboring Node Bs and a transmission start point of a second system frame from the second Node B of the neighboring Node Bs, from a UE located in the handover region to the RNC; multiplying a particular integer among integers between 0 and 255 by the total number of chips constituting one system frame number, adding the multiplied result and a particular integer among integers between 0 and 38399, and transmitting the added result as a first offset for determining a transmission start point of the frames of the broadcast data by the RNC; and adding a difference between the start points and the first offset, and transmitting the added result as a second offset for enabling the second Node B to transmit the frame of the broadcast data at the same time as the first Node B.

In accordance with a third aspect of the present invention, there is provided a method for transmitting broadcast data from neighboring Node Bs to one of a plurality of user equipments (UEs) when the UE moves to a handover region between the neighboring Node Bs, in a code division multiple access (CDMA) mobile communication system having at least two neighboring Node Bs, a radio network controller (RNC) connected to the Node Bs, and the UEs located in cells occupied by corresponding Node Bs, wherein the Node Bs transmit data asynchronously and transmit common broadcast data to the UEs within the Node Bs. The method comprises requesting, by the RNC, the neighboring Node Bs to report an inter-system frame number observed time difference with a counterpart Node B to the neighboring Node Bs; reporting, by each neighboring Node B, to the RNC a difference between a transmission start point of its first system frame and a reception start point of a second system frame corresponding to the first system frame, received from the counterpart Node B; determining, by the RNC, a transmission time offset of each of the neighboring Node Bs so that the neighboring Node Bs can transmit frames of the broadcast data at the same time, based on the difference values reported from the neighboring Node Bs, and then transmitting the determined transmission time offsets to the corresponding neighboring Node Bs; and transmitting, by each neighboring Node B, frames of the broadcast data at a transmission time to which the offset provided form the RNC is applied.

In accordance with a fourth aspect of the present invention, there is provided a method for transmitting broadcast data from neighboring Node Bs to one of a plurality of user equipments (UEs) when the UE moves to a handover region between the neighboring Node Bs, in a code division multiple access (CDMA) mobile communication system having at least two neighboring Node Bs, a radio network controller (RNC) connected to the Node Bs, and the UEs located in cells occupied by corresponding Node Bs, wherein the Node Bs transmit data asynchronously and transmit common broadcast data to the UEs within the Node Bs. The method comprises requesting, by the RNC, a UE located in the handover region to report an inter-system frame number observed time difference between the neighboring Node Bs; receiving, by the UE, system frames from the neighboring Node Bs, measuring an inter-system frame number observed time difference based on a time point where the system frames were transmitted from the neighboring Node Bs, and reporting the measured result to the RNC; determining, by the RNC, a transmission time offset of each of the neighboring Node Bs so that the neighboring Node Bs can transmit frames of the broadcast data at the same time, based on the inter-system frame number observed time difference reported from the UE, and then transmitting the determined transmission time offsets to corresponding neighboring Node Bs; and transmitting, by each neighboring Node B, the frames of the broadcast data at a transmission time to which the offset provided from the RNC is applied.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
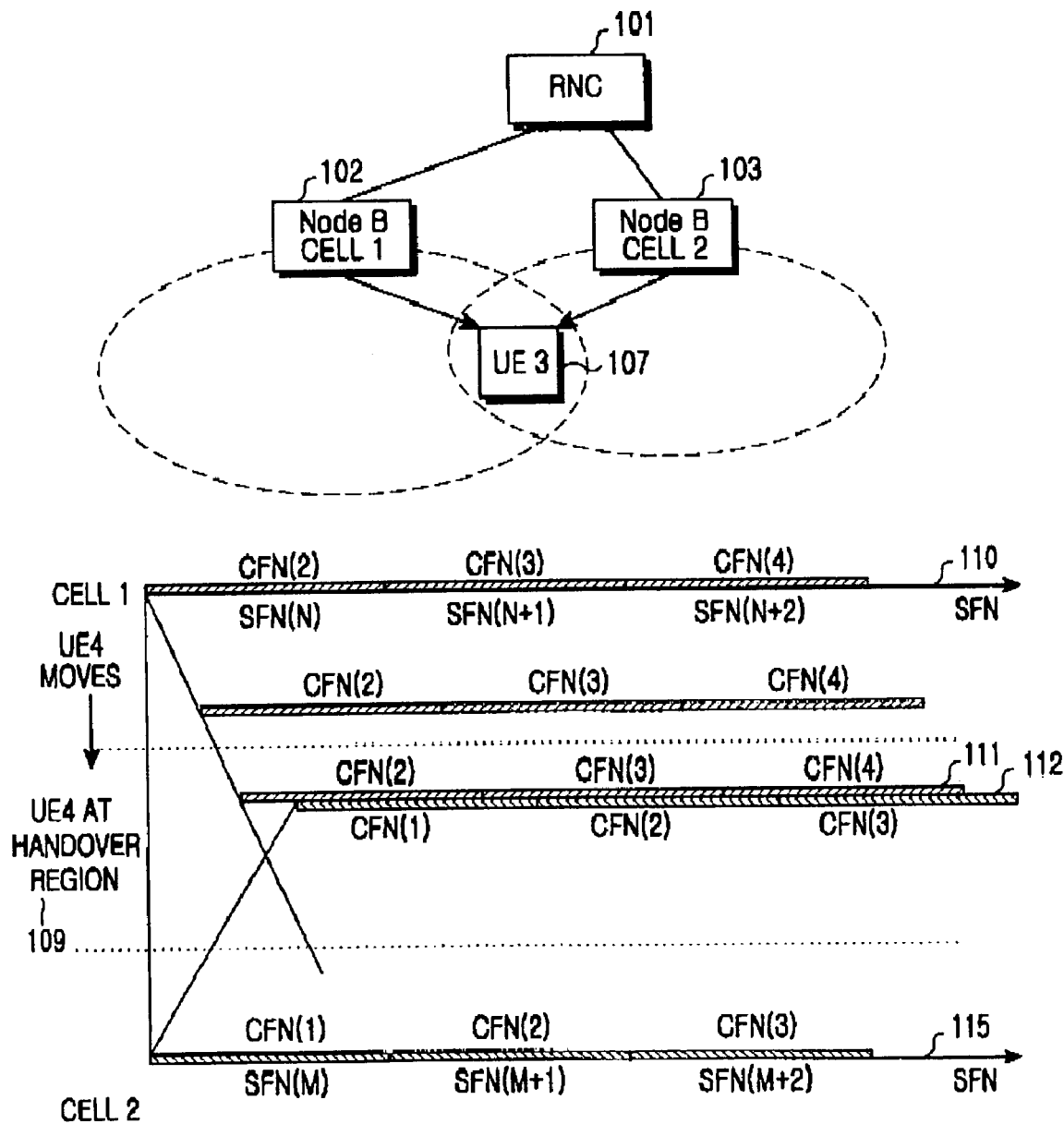
FIG. 1 illustrates a procedure for transmitting data from an RNC to a UE in a conventional asynchronous mobile communication system including the RNC and Node Bs.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

In the following description, the present invention will be presented using one typical embodiment to achieve the technical subjects stated above, and other possible embodiments of the present invention will be briefly mentioned without detailed description.

A description will now be made of a conventional procedure for transmitting and receiving MBMS data in an asynchronous mobile communication system supporting an MBMS service. Of course, a scheme proposed by the present invention can be applied even to an asynchronous mobile communication system having an RNC and a plurality of Node Bs.

FIG. 1 shows that when there is no separate synchronization process between Node Bs, a UE receives MBMS data from the Node Bs at different times due to non-synchronization between the Node Bs. That is, FIG. 1 illustrates a procedure for transmitting MBMS data from an RNC to a UE in an asynchronous mobile communication system consisting of the RNC and two Node Bs. It is assumed in FIG. 1 that a Node B has one cell.

Referring to FIG. 1, an RNC 101 transmits MBMS data received from a network to a first Node B 107 and a second Node B 103. For that purpose, it can be assumed that the RNC 101 copies the MBMS data into two MBMS data blocks and then separately transmits the copied MBMS data blocks to the first and second Node Bs 102 and 103 at the same time. A connection frame number (CFN) is transmitted along with the MBMS data. However, although the MBMS data blocks were transmitted from the RNC 101 at the time, if consideration is taken for a transmission delay to the Node Bs 102 and 103, the Node Bs 102 and 103 will receive the MBMS data at different times. The Node Bs 102 and 103 must determine SFN where they will transmit the MBMS data with the CFN. The CFN has a value between 0 and 255, and the SFN has a value between 0 and 4095. Therefore, a transmission point of MBMS data with CFN having a remainder value obtained by dividing a particular SFN by 256, i.e., a result value obtained by performing a modulo-256 operation on the SFN (SFN mod 256), is determined as the particular SFN. For example, a time point with SFN=3076 is determined as a transmission point of MBMS data with CFN=4.

In FIG. 1, reference numeral 110 represents an SFN, which is a time axis of a cell #1, and SFN(N) and SFN(N+1) represent a change in SFN due to the passage of time. According to the reference numeral 110, data with CFN(2) is transmitted at SFN(N) by the cell #1, and data with CFN (3) is transmitted at SFN(N+1) by the cell #1. When generalized, data with CFN(k) is transmitted at SFN(N+k−2) by the cell #1.

In FIG. 1, reference numeral 115 represents an SFN, which is a time axis of a cell #2, and SFN(M) and SFN(M+ 1) represent a change in SFN due to the passage of time. According to the reference numeral 115, data with CFN(1) is transmitted at SFN(M) by the cell #2, and data with CFN(2) is transmitted at SFN(M+1) by the cell #2. When generalized, data with CFN(k) is transmitted at SFN(M+k− 1) by the cell #2.

FIG. 1 is an example where the cell #1 and the cell #2 are frame-synchronized, but different from each other in SFN. That is, FIG. 1 illustrates a case where when SFN in the cell #1 is N, SFN of the cell #2 is M. However, in general, different cells coincide with each other in SFN, and also in a frame start point. For the convenience of explanation, it is assumed in the present invention that different cells coincide with each other in a frame start point.

As the cell #1 and the cell #2 receive MBMS data having the same CFN at different times, their transmission points are different from each other. For example, the cell #1 transmits MBMS data with CFN(2) at SFN(N), while the cell #2 transmits MBMS data with CFN(2) at SFN(M+1).

In FIG. 1, reference numeral 111 represents a signal that a UE #4 located in a handover region receives from the cell #1, and reference numeral 112 represents a signal that the UE #4 receives from the cell #2. The UE #4 can receive more accurate MBMS data by combining the signal received from the cell #1 with the signal received from the cell #2. At this moment, the combining must be performed on MBMS data having the same CFN. For example, the UE #4 combines MBMS data CFN(2) transmitted from the cell #1 at SFN(N) with MBMS data CFN(2) transmitted from the cell #2 at SFN(M+1).

However, a transmission delay between the cell #1 and the UE #4 may be different from a transmission delay between the cell #2 and the UE #4. In FIG. 1, a transmission delay of a signal received from the cell #2 is relatively longer than a transmission delay of a signal received from the cell #1. Therefore, to combine, the UE #4 must continuously store MBMS data received from the cell #1 in its buffer, until MBMS data with the same CFN is received from the cell #2. However, if a difference between a time when MBMS data from the cell #1 is received and a time when MBMS data from the cell #2 is received is larger than a predetermined value (e.g., 256 chips), it may not possible to continuously store the first received MBMS data in a buffer.

In order to solve this problem, MBMS data with the same CFN from a plurality of cells must be received at a UE located in a handover region within a predetermined time period.

Therefore, the present invention provides a method for synchronizing transmission points of plural cells so that the same MBMS data transmitted from the plural cells can be received at a UE within a predetermined time, and a method for enabling the UE to combine the received same MBMS data.

In the present invention, if an MBMS service is supported in an asynchronous mobile communication system, synchronization must be performed on data transmission time between Node Bs in order to provide soft handover to a UE. However, as stated above, in the asynchronous mobile communication system, timing synchronization between Node Bs is not provided. That is, in the asynchronous mobile communication system, synchronization is performed only between an RNC and a Node B, and between a Node B and a UE. Therefore, in an asynchronous mobile communication system supporting an MBMS service, MBMS data transmission time difference must be minimized by acquiring synchronization between cells, in order to provide soft handover. This enables a UE that receives the same data from different Node Bs, to soft-combine the received same data. Therefore, although the UE moves from one cell to another cell, the UE can continuously receive MBMS data without loss of data.

In order to synchronize transmission points of all Node Bs existing in one RNC as stated above, a UE informs the RNC of relative time information for the time points where the UE receives transmission data from each cell, and the RNC synchronizes transmission timings of corresponding Node Bs depending on the relative time information.

In an asynchronous mobile communication system supporting an MBMS service according to an embodiment of the present invention, in order to support an MBMS service to a UE that requires soft handover, the following procedures are required:

1) Node Synchronization Procedure; and
2) Measurement Procedure for Soft Handover of UE in MBMS Service and Data Transmission Time Synchronization Procedure in Node B.

A detailed description of the above procedures will now be made hereinbelow.

1. Node Synchronization Procedure

Figure 4:
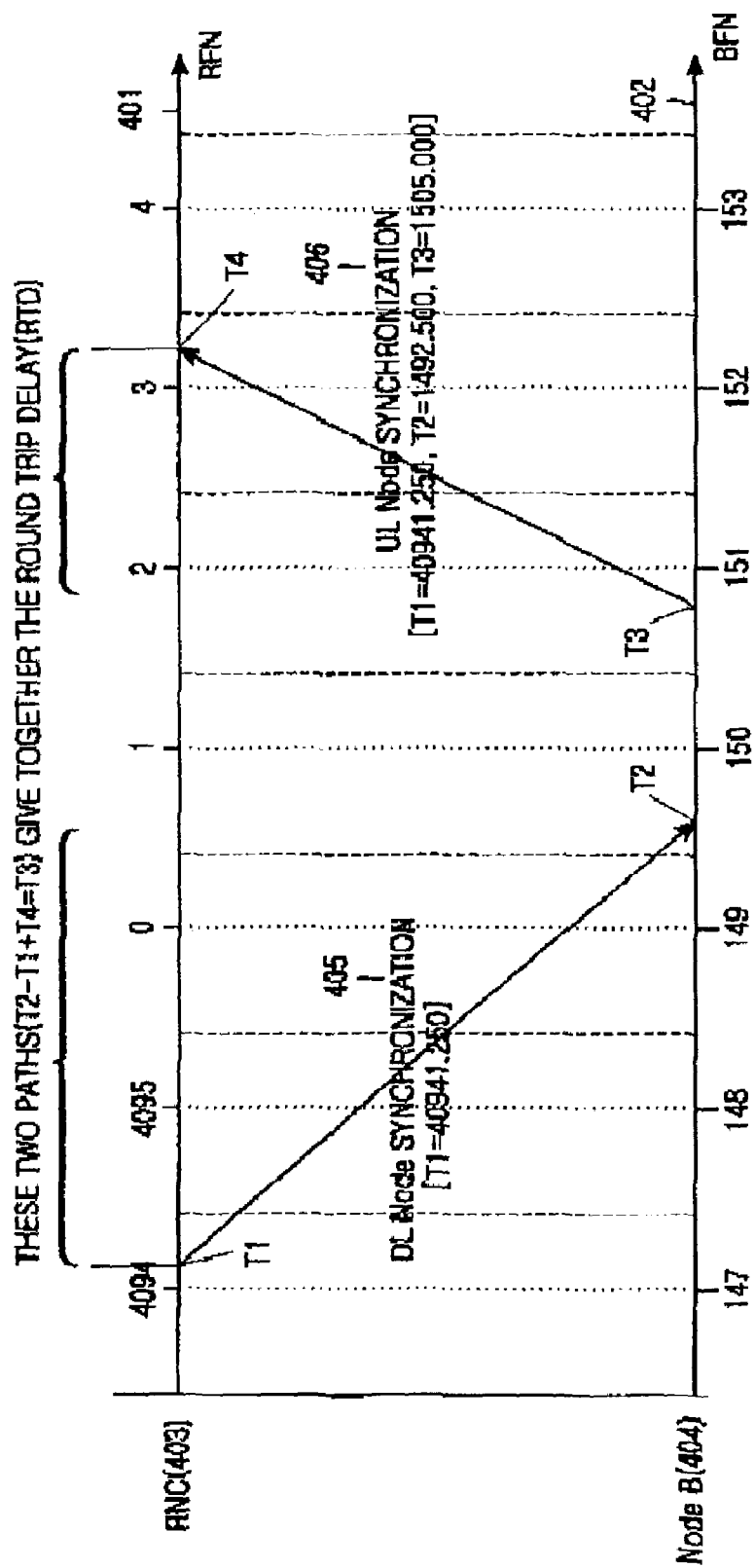
FIG. 4 illustrates a timing relationship between an RNC and a Node B, and a Node synchronization procedure through message transmission according to an embodiment of the present invention.

For MBMS offset determination, a Node synchronization process for slot or frame-based synchronization between an RNC and a Node B is required. FIG. 4 illustrates a timing relationship between an RNC and a Node B, and a Node synchronization process through transmission of a particular message.

Referring to FIG. 4, reference numeral 401 represents a time axis of an RNC 403, and reference numeral 402 represents a time axis of a Node B 404. The time axis 401 of the RNC 403 is divided by an RNC frame number (hereinafter referred to as "RFN"). The RFN ranges from 0 to 4095, and has a time length of 10 ms. The time axis 402 of the Node B 404 is divided by a Node B frame number (hereinafter referred to as "BFN"). Like the RFN, the BFN also ranges from 0 to 4095, and has a time length of 10 ms. In FIG. 4, the RFN and the BFN are out of synchronization.

The Node synchronization process is a procedure for acquiring information on the time axis 402 of the Node 404 by the RNC 403. The Node synchronization process is performed by the following steps.

The RNC 403 transmits a downlink (DL) Node synchronization frame 405 for Node synchronization to a particular Node 404 (Step a). After receiving the DL Node synchronization frame 405 transmitted from the RNC 403, the Node 404 transmits an uplink (UL) Node synchronization frame 406 to the RNC 403 in response to the received DL Node synchronization frame 405 (Step b). Upon receiving the UL Node synchronization frame 406, the RNC 403 acquires information on the time axis 402 of the Node 404 by determining an estimation value for a time difference between RFN and BFN (Step c).

The respective steps for the Node synchronization process will now be described in more detail.

In Step a, the RNC 403 inserts a time value T1 on the time axis 401, where the DL Node synchronization frame 405 is to be transmitted, into the DL Node synchronization frame 405, and transmits the time value T1-inserted DL Node synchronization frame 405 to the Node B 404. The time value T1 is a time value measured by the 0.250 ms on the time axis 401. For example, in FIG. 4, the time value T1 where the DL Node synchronization frame 405 is to be transmitted is 40941.250 ms. The 40941.250 ms means that the DL Node synchronization frame 405 is transmitted 1.250 ms after a start point of RFN 4094.

In Step b, the Node 404 receives the DL Node synchronization frame 405 transmitted from the RNC 403, and indentifies the time value T1. Further, the Node B 404 determines a time value T2 on the time axis 402, representing a time point where the DL Node synchronization frame 405 was received. After a lapse of a predetermined time, the Node 404 transmits to the RNC 403 the UL Node synchronization frame 406 including a time value T3 representing a time point where T1, T2, and the UL Node synchronization frame 406 are to be transmitted. Like T1, the time values T2 and T3 also represent the time values measured by the 0.250 ms. For example, it is assumed that T2 is 1492.500 ms and the T3 is 1505.000 ms. T2 indicates that the Node 404 received the DL Node synchronization frame 405, 2.5 ms after BFN 149. T3 indicates that the Node B 404 started transmission of the UL Node synchronization frame 406, 5 ms after BFN 150.

In Step c, the RNC 403 receives the UL Node synchronization frame 406 and extracts T2 and T3 from the received UL Node synchronization frame 406. By receiving the UL Node synchronization frame 406, the RNC 403 indentifies a time value T4 representing its reception point. As a result, the RNC 403 can identify T1, T2, T3 and T4.

The RNC 403 can calculate a round trip delay (RTD) between the RNC 403 and the Node 404 based on T1, T2, T3 and T4. The round trip delay RTD can be calculated by $$RTD = T4 - T1 - (T3 - T2) \qquad \text{Equation (1)}$$

As illustrated in Equation (1), the round trip delay can be defined as the sum of a time required when the DL Node synchronization frame 405 is transmitted from the RNC 403 to the Node B 404, and a time required when the UL Node synchronization frame 406 is transmitted from the Node 404 to the RNC 403.

The RNC 403 can calculate one-way delay (OWD) by the round trip delay. That is, a value determined by halving the round trip delay can be assumed to be the one-way delay. From Equation (1), the one-way delay OWL can be represented by $$OWD = [T4 - T1 - (T3 - T2)]/2 \qquad \text{Equation (2)}$$

The one-way delay represented by Equation (2) indicates a time required when a particular frame is transmitted from the RNC 403 to the Node B 404, or from the Node B 404 to the RNC 403. In order to assume the one-way delay to be ½ of the round trip delay, an uplink one-way delay must be identical to a downlink one-way delay. However, in general, since an uplink one-way delay is different from a downlink one-way delay, the one-way delay calculated by Equation (2) is an estimation value, not an exact value.

The RNC 403 can determine a relationship between RFN, i.e., a time axis 401 in the RNC 403, and BFN, i.e., a time axis 402 in the Node B 404, by using the round trip delay. That is, T2 becomes a time value at a time point where the one-way delay has passed from T1. For example, it is noted in FIG. 4 that T2 at a time point where the one-way delay has passed from T1 (=40941.250), becomes 14941.250. If it is assumed that T4 is 33 (T4=33), the one-way delay becomes 51.75/2. Thus, T2 (=1492.500) on the time axis 402 of the Node 404 can be represented by Equation (3) on the time axis 401 of the RNC 403.

$$T1(=40941.250) + 51.75/2 = 40967.125 \qquad \text{Equation (3)}$$

T2 (=40967.125) on the time axis 401 of the RNC 403, calculated by Equation (3), can be expressed as 7.125 by a modulo operation. The reason for performing the modulo operation is because, as stated above, RFN on the time axis 401 of the RNC 403 has a value between 0 and 4095. Therefore, a difference between the time axis 402 of the Node 404 and the time axis 401 of the RNC 403 can be calculated by $$(\text{Node } B \text{ time axis}) - (RNC \text{ time axis}) = 1492.5 - 7.125 = 1485.375 \qquad \text{Equation (4)}$$

Therefore, when generalized, Equation (4) can be expressed as $$(\text{Node } B \text{ time axis}) - (RNC \text{ time axis}) = \quad \text{Equation (5)}$$
$$T2 - (T1 + [T4 - T1 - (T3 - T2)]/2) =$$
$$1/2(2T2 - 2T1 - T4 + T1 + T3 - T2) =$$
$$1/2(T2 - T1 - T4 + T3)$$

As described above, a difference value between the time axis 401 of the RNC 403 and the time axis 402 of the Node 404 is an exact value, when the downlink one-way delay is identical to the uplink one-way delay. However, in general, because the downlink one-way delay is not identical to the uplink one-way delay, the difference value is not an exact value. In order to solve this problem, the DL Node synchronization frame and the UL Node synchronization frame are given highest priority during their transmission. This is to consider only a pure transmission delay as the downlink and uplink one-way delays by minimizing transmission delays of the DL Node synchronization frame and the UL Node synchronization frame. As a result, the downlink one-way delay can be sufficiently similar to the uplink one-way delay.

The timing relationship between the time axis 402 of the Node 404 and the time axis 401 of the RNC 403, estimated through the Node synchronization process, is determined according to how closely the downlink one-way delay is to the uplink one-way delay. That is, it is possible to determine whether the timing relationship between the time axis 402 of the Node 404 and the time axis 401 of the RNC 403 is correct even on a slot basis or frame basis. In the following description, consideration will be taken into a case where the estimation value is correct a slot basis, and a case where the estimation value is correct a frame basis. The Node synchronization process can be performed either periodically, or before or after data transmission.

2. Measurement Procedure for Soft Handover of UE in MBMS Service and Data Transmission Time Synchronization Procedure in Node B It will be assumed herein that slot or frame-based synchronization between an RNC and a Node B has already been achieved when an MBMS offset is determined by a measurement error (or SFN-SFN difference) from a UE or a Node B, representing a time difference in a chip unit between nearest slots or fames. The slot or frame-based synchronization between the RNC and the Node B, as described above, can be assumed by the Node synchronization procedure. In addition, it is assumed in the present invention that respective Node Bs have the same cell radius. Therefore, a UE located the same distance from two cells can receive data at the same time, when the two cells transmit the data at the same time. Finally, in the following description of the present invention, reference will be made only to the matters necessarily needed to understand the invention. A description of when the two cells have different radiuses will not be made, because it can be considered as an extension of the invention.

A process of synchronizing time points when the cells transmit the same MBMS data, and performing by each UE soft handover, or soft combining, on the synchronized MBMS data can be performed through the following steps.

Step 1: measuring an SFN-SFN observed time difference in order to determine time information for Node Bs within one RNC, and delivering the SFN-SFN observed time difference to the RNC.

Step 2: analyzing by the RNC a timing relationship between Node Bs based on the SFN-SFN observed time difference collected in Step 1, and determining an MBMS offset necessary for the Node Bs.

Step 3: delivering the MBMS offset determined in Step 2 to corresponding Node Bs and a corresponding UE.

Step 4: previously transmitting data to determine a timing relationship between an RNC and a Node B before transmission of MBMS data so that the Node B can transmit data in accordance with the MBMS offset determined in Step 3 (user plane synchronization).

Step 5: transmitting the MBMS data according to the timing relationship determined in Step 4.

The respective steps will be separately described in detail hereinbelow with reference to preferred embodiments and the accompanying drawings.

The above steps, together with the above-stated Node synchronization process for determining a relationship between timing in an RNC and timing in a Node B between the RNC and the Node B, can be necessary for the above steps and transmission of MBMS data. Alternatively, the Node synchronization process can be previously performed between the RNC and the Node B, independently of the above steps.

The MBMS soft handover procedure by the above steps can be divided into a method (a first embodiment) for measuring a UE SFN-SFN observed time difference by a UE, and another method (a second embodiment) for measuring a Node B SFN-SFN observed time difference by a Node B.

The MBMS soft handover procedure will now be described in detail on the assumption that a UE is located in a handover region where it can simultaneously receive MBMS data from two Node Bs.

3. Embodiments 3-1. First Embodiment (SFN-SFN Observed Time Difference Transmitted From a UE to a RNC)

A description of a procedure for performing soft handover in an asynchronous mobile communication system according to an embodiment of the present invention will now be made in accordance with the above-stated steps.

First, a detailed description will be made of Step 1, i.e., of measuring a UE SFN-SFN observed time difference by a UE to determine time information for Node Bs within one RNC, and delivering the measured UE SFN-SFN observed time difference to the RNC.

In order to measure a UE SFN-SFN observed time difference from a UE, the RNC can either select a particular UE for the measurement, or determine a value by taking statistics on measurement values received from several UEs as a UE SFN-SFN observed time difference. In order to enable a particular UE to measure a UE SFN-SFN observed time difference, the RNC must select a particular UE. The particular UE can be selected by a signal-to-interference ratio (hereinafter referred to as "SIR") value of a common pilot channel (hereinafter referred to as "CPICH") received at UEs from a Node B. That is, the RNC enables the UE to measure information on a time point when the RNC transmits MBMS data to a plurality of Node Bs so that a UE receiving the MBMS data from a plurality of Node Bs, i.e., a UE for which soft handover is required, can receive MBMS data from the Node Bs with the minimum time difference. The RNC can select a UE determined to be located in a handover region by an SIR value of CPICH received from a Node B, and enable the UE to measure a UE SFN-SFN observed time difference.

A UE SFN-SFN observed time difference measured by a UE located in a handover region where it simultaneously receives data from a plurality of Node Bs can be defined as $$\text{UE SFN-SFN observed time difference} = OFF \times 38400 + T_m \qquad \text{Equation (6)}$$

Herein, it will be assumed that a first Node B and a second Node B corresponding to the plurality of Node Bs transmit MBMS data to a UE. In Equation (6), $T_m$ indicates a chip offset, and can be defined as $$T_m = T_{RxSFNj} - T_{RxSFNi} \qquad \text{Equation (7)}$$

A unit of the Tm defined by Equation (7) is a chip, and has an effective area of [0,1, ... 38999]. In Equation (7), $T_{RxSFNj}$ represents a particular frame start point of P-CCPCH (Primary Common Control Physical channel) received from a $j^{th}$ cell, and $T_{RxSFNi}$ represents a frame start point of P-CCPCH that a UE received from an $i^{th}$ cell before the $T_{RxSFNj}$. It is assumed that the $j^{th}$ cell corresponds to the first Node B, while the $i^{th}$ cell corresponds to the second Node B.

In Equation (6), OFF indicates an offset in a frame unit, and is defined as $$OFF = (SFN_j - SFN_i) \bmod 256 \qquad \text{Equation (8)}$$

In Equation (8), an effective area of OFF is [0,1, ... 255]. In addition, $SFN_j$ represents a frame number of a downlink P-CCPCH that a UE received from the $j^{th}$ cell (or the first Node B) at the time point $T_{RxSFNj}$, and the $SFN_i$ represents a frame number of a downlink P-CCPCH that the UE received from the $i^{th}$ cell (or the second Node B) at the time point $T_{RxSFNi}$. Therefore, the $T_{RxSFNj}$ represents a start point of a frame corresponding to the $SFN_j$, while the $T_{RxSFNi}$ represents a start point of a frame corresponding to the $SFN_i$. Selection on a UE that will measure the UE SFN-SFN observed time difference has been described in detail in conjunction with the description of a procedure for determining that a particular UE is located in a handover region.

A UE reporting the measured UE SFN-SFN observed time difference to the RNC, can additionally report information on power of CPICH for Node Bs on which the measurement was performed. The power information can be used by the RNC in a process of determining a particular position between the two Node Bs, where the UE is located. That is, if a power level of CPICH from the first Node B is higher than a power level of CPICH from the second Node B, the RNC can determine that the UE is located nearer to the first Node B rather than the second Node B. This example corresponds to when transmission power of CPICH from the first Node B is identical to transmission power of CPICH from the second Node B. When power levels of CPICH from the Node Bs are different from each other, because the RNC previously knows the different power information, the RNC may determine a position of the UE by using information on the transmitted power in addition to the power that the UE received. However, because the important thing is CPICH reception power of the UE, it is preferable to assume that if the CPICH reception power levels are identical to each other, the UE is located in a handover region.

The UE SFN-SFN observed time difference calculated in Step 1 is delivered from the UE to the RNC using a radio link control (hereinafter referred to as "RRC") message. The UE SFN-SFN observed time difference delivered to the RNC is information on a relationship between time axis values (or SFNs) of the Node Bs.

Next, a detailed description will be made of Step 2, i.e., of determining a timing relationship between Node Bs depending on the SFN values calculated in Step 1, and determining MBMS offsets to be delivered to the respective Node Bs. Even in the description of Step 2, it will be assumed that as the two cells have the same cell radius, a handover region is defined centering on a place located at the same distance from the two Node Bs. That is, it is assumed that as transmission power levels from the two Node Bs are identical to each other and the distances from the Node Bs are also identical to each other. Therefore, data transmitted by the two Node Bs at the same power arrives at the UE at the same time. When the two cells have different cell radiuses, determination on a transmission time of the same MBMS data can be additionally performed using power from the two cells. That is, if the two cells are not identical in a radius, information on the power levels can be additionally used in determining an MBMS data transmission time.

When a UE SFN-SFN observed time difference is received from a particular UE in Step 1, the UE SFN-SFN observed time difference is a value represented by Equation (6). The UE SFN-SFN observed time difference can be defined as a difference between two Node Bs' transmission points at a particular time, and can be represented by $$\text{UE SFN-SFN observed time difference} = \text{Node } B\#1\text{'s transmission point} - \text{Node } B\#2\text{'s transmission point} \qquad \text{Equation (9)}$$

In Equation (9), "transmission point" indicates a transmission side's time axis with respect to cells of the Node Bs, represented by SFN, and can be considered on a chip basis. That is, the transmission point has a value between 0 and $256 \times 38400^{th}$ chips. If the transmission point has a value between 0 and $38400^{th}$ chips ($0 \leq$ transmission point $\leq 38400^{th}$ chips), it can be indicated that transmission is made at SFN(1), and if the transmission point has a value between an $SFN \times 38400^{th}$ chips and an $(SFN+1) \times 38400^{th}$ chips ($n \times 38400^{th}$ chips $\leq$ transmission point $\leq (n+1) \times 38400^{th}$ chips), it can be indicated that transmission is made at SFN(n).

In Equation (9), a $j^{th}$ cell is assumed to be a cell #1 (or first Node B) and an $i^{th}$ cell is assumed to be a cell #2 (or second Node B). In this case, the OFF ($=SFN_j - SFN_i \bmod 256$) represents a difference in frame between the cell #1 and the cell #2, and the $T_m$ represents a difference between adjacent frames of cell #1 and cell #2.

The RNC can select a particular cell to transmit transmission data at the same time point as SFN of the selected cell. That is, CFN representing sequence of data can be fixed to SFN indicating a data transmission point. An MBMS offset, a difference between a unique number 'CFN' of transmission data and a transmission point of data with the CFN, can be determined by $$MBMS \text{ offset} = (\text{transmission point} - CFN) = 0 \qquad \text{Equation (10)}$$

Data transmitted from the RNC to the Node B according to Equation (10) is transmitted at SFN having the same value as a corresponding CFN. The SFN has a value between 0 and 4095 and the CFN has a value between 0 and 255. Thus, when the SFN exceeds 255, if a remainder determined by dividing the SFN by 256 is identical to the CFN, it is determined that SFN is equal to CFN.

It is also possible to transmit data with CFN to the particular cell by applying as much time difference as an MBMS offset value instead of transmitting the data at a time point SFN having the same value as described in conjunction with the above method. The MBMS offset value can be calculated by $$MBMS \text{ offset} = (\text{transmission point} - CFN) = OFF0 \times 38400 + \text{Chip\_offset} \quad \text{Equation (11)}$$

In Equation (11), OFF0 has a particular value between 0 and 255, and can be determined by the RNC, and Chip_offset has a value between 0 and 38399 (0≦Chip_offset≦38399), and can also be determined by the RNC. That is, by determining a particular offset value by selecting a particular Node B, it is possible to preferentially set a relationship between CFN for data and a transmission time of the selected Node B.

For convenience of description, the selected particular cell is assumed herein to be a first Node B (or cell #1). That is, the RNC sets a CFN, a corresponding data number, considering an SFN of cell #1 (or the first Node B). As described above, it is assumed that CFN and SFN are set to have the same value,. That is, the RNC determines to transmit data with a CFN having the same value at the time point SFN of the cell #1.

Once a relationship between CFN and SFN is determined for one cell as stated in conjunction with the above example, an MBMS offset value representing a relationship between CFN, i.e., a unique number of data to be transmitted to the cell #1, for the cell #2 sharing a handover region with the cell #1, and SFN, i.e., a time axis of the cell #2, can be determined using SFN-SFN observed time difference of the cell #1 and cell #2, received in Step 1.

When the SFN-SFN observed time difference of the cell #1 and cell #2 is determined by $OFF \times 38400 + T_m$ as described in conjunction with the above example and a relationship between a transmission point SFN of the cell #1 and a unique number CFN of the MBMS data is determined by "transmission point mod 256=CFN" as described in conjunction with the above assumption, then an MBMS offset value for the cell #2 can be determined by $$MBMS \text{ offset} = (\text{Cell \#2's transmission point} - CFN) = OFF \times 38400 + T_m \quad \text{Equation (12)}$$

Therefore, in cell #1, data having a particular CFN value is transmitted at SFN having the same value as the CFN, and in the cell #2, the data is transmitted at a transmission point having a value determined by the sum of the CFN and $OFF \times 38400 + T_m$ as illustrated in Equation (12). Because a time difference between cell #1 and cell #2 could be calculated by $OFF \times 38400 + T_m$ through the measurement in Step 1, it can be noted that the CFN is transmitted from each cell at the same time point.

Generally, when the transmission point is not identical to the CFN in the cell #1 as described in conjunction with the above example and has a predetermined offset represented by Equation (11), a transmission point of cell #2 can be calculated by $$MBMS \text{ offset} = (\text{Cell \#2's transmission point} - CFN) = \quad \text{Equation (13)}$$
$$(\text{Cell \#2's transmission point} -$$
$$\text{Cell \#1's transmission point}) +$$
$$(\text{Cell \#1's transmission point} - CFN) =$$
$$(SFN - SFN \text{ observed time difference}$$

-continued
$$\text{between Cell \#1 and Cell \#2}) +$$
$$(\text{Cell \#1's } MBMS \text{ offset}) = (OFF \times 38400 + T_m) +$$
$$(OFF0 \times 38400 + \text{Chip\_offset})$$

According to Equation (11) and Equation (13), a transmission point of one CFN of each Node B is "Cell #1's transmission point=CFN+OFF0×38400+Chip-offset " for the cell #1, and "Cell #2's transmission point=CFN+OFF× $38400 + T_m + OFF0 \times 38400 + Chip_{13}$ offset" for the cell #2. Because a transmission time difference between the cell #1 and the cell #2 is "$OFF \times 38400 + T_m$," i.e., because "Cell #2's transmission point−Cell #1's transmission point=$OFF \times 38400 + T_m$," it can be understood from the above formula that the same CFNs are transmitted at the same time.

To summarize, a relationship between a transmission point of a cell within one Node B and CFN is determined by Equation (10) or Equation (11). When the relationship between CFN and a transmission point is already given, this process can be omitted. Once a relationship between a transmission point of one cell and CFN is determined, a relationship between a transmission point of a neighboring cell and CFN is determined for the cells neighboring the cell by using an SFN-SFN observed time difference obtained in Step 1 from timing relationship between cells. Even for another cell neighboring the cell, a relationship between a transmission point and CFN can be determined through the same process by using Equation (12) or Equation (13).

In the present invention, the relationship between a transmission point and CFN is referred to as "MBMS offset." The MBMS offset can be determined by the RNC by performing the above process on the cells of the Node Bs.

A detailed description will now be made of Step 3 of delivering the MBMS offset value determined in Step 2 to corresponding Node Bs and corresponding UEs.

The MBMS offset value of the cell (or Node B) determined by the RNC is transmitted to a UE and a Node B through an RRC message and an NBAP (Node B Application Part) message, respectively. The MBMS offset determined by the RNC can be transmitted to either a corresponding Node B, or a Node B to which MBMS data is not currently transmitted, in order to simultaneously control transmission time at several Node Bs. That is, in order for each Node B to determine transmission times of MBMS data to be synchronized, an MBMS offset to be considered in each cell is previously transmitted to several Node Bs so that they previously know the MBMS offset. Therefore, by previously considering an MBMS offset between neighboring Node Bs, the Node B uses the MBMS offset to determine an MBMS data transmission time in preparation for handover of a UE or when starting an MBMS service. Upon receiving the MBMS offset value, the Node B and the UE determine a data transmission point according to the received MBMS offset value, thereby enabling soft combining on the same data transmitted from several cells.

Figure 2:
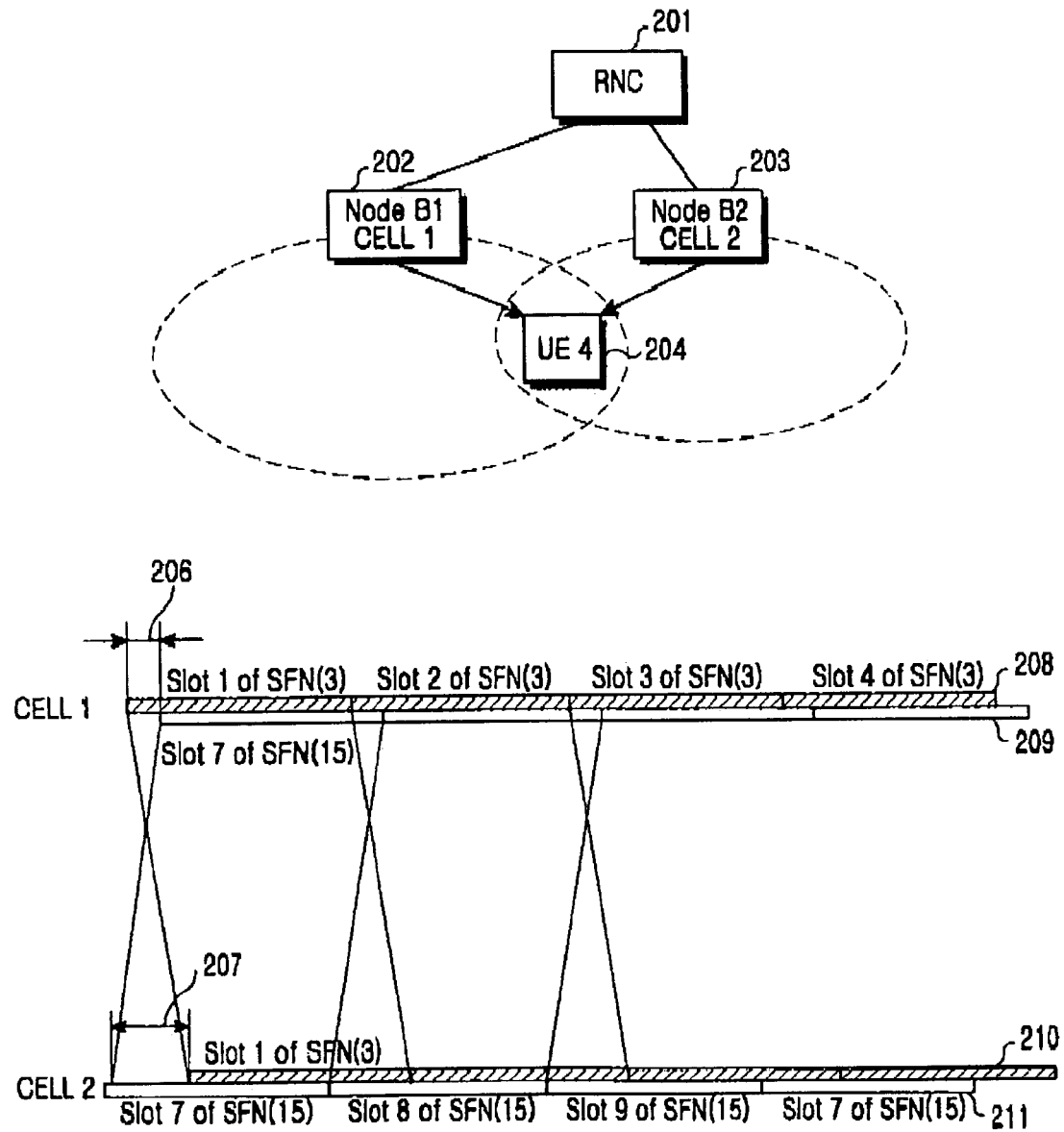
FIG. 2 illustrates an example of a procedure for transmitting data from an RNC to a UE in a conventional asynchronous mobile communication system including the RNC and Node Bs.

Referring to FIG. 2, when a UE receives an MBMS offset (first MBMS offset) for the cell #1 and an MBMS offset (second MBMS offset) for the cell #2, a signal received from the cell #1 at "SFN(k)+first MBMS offset" and a signal received from the cell #2 at "SFN(k)+second MBMS offset" are the same data. The signals can be soft-combined. In the above formulas, k of SFN(k) can become a value between 0 and 4095. Meanwhile, a Radio Bearer Setup message and a Radio Link Setup message are available for an RRC message and an NBAP message, used in the MBMS offset transmission procedure, respectively. Of course, a format of the messages for transmitting the MBMS offsets to the UE and the Node B can be modified.

A detailed description will now be made of Step 4 (user plane synchronization step) of determining a timing relationship between an RNC and a Node B before transmission of MBMS data so that the Node B can transmit data in accordance to the MBMS offset determined in Step 3.

The user plane synchronization process is a process of synchronizing data streams of downlink dedicated channel or maintaining or restoring a current synchronization state, and is performed on an Iur transport bearer, i.e., a protocol between an RNC and an RNC, and a Iub transport bearer, i.e., a protocol between an RNC and a Node B. Generally, a user plane synchronization process for a particular radio link is performed to synchronize all transport bearers for the corresponding radio link.

Figure 3:
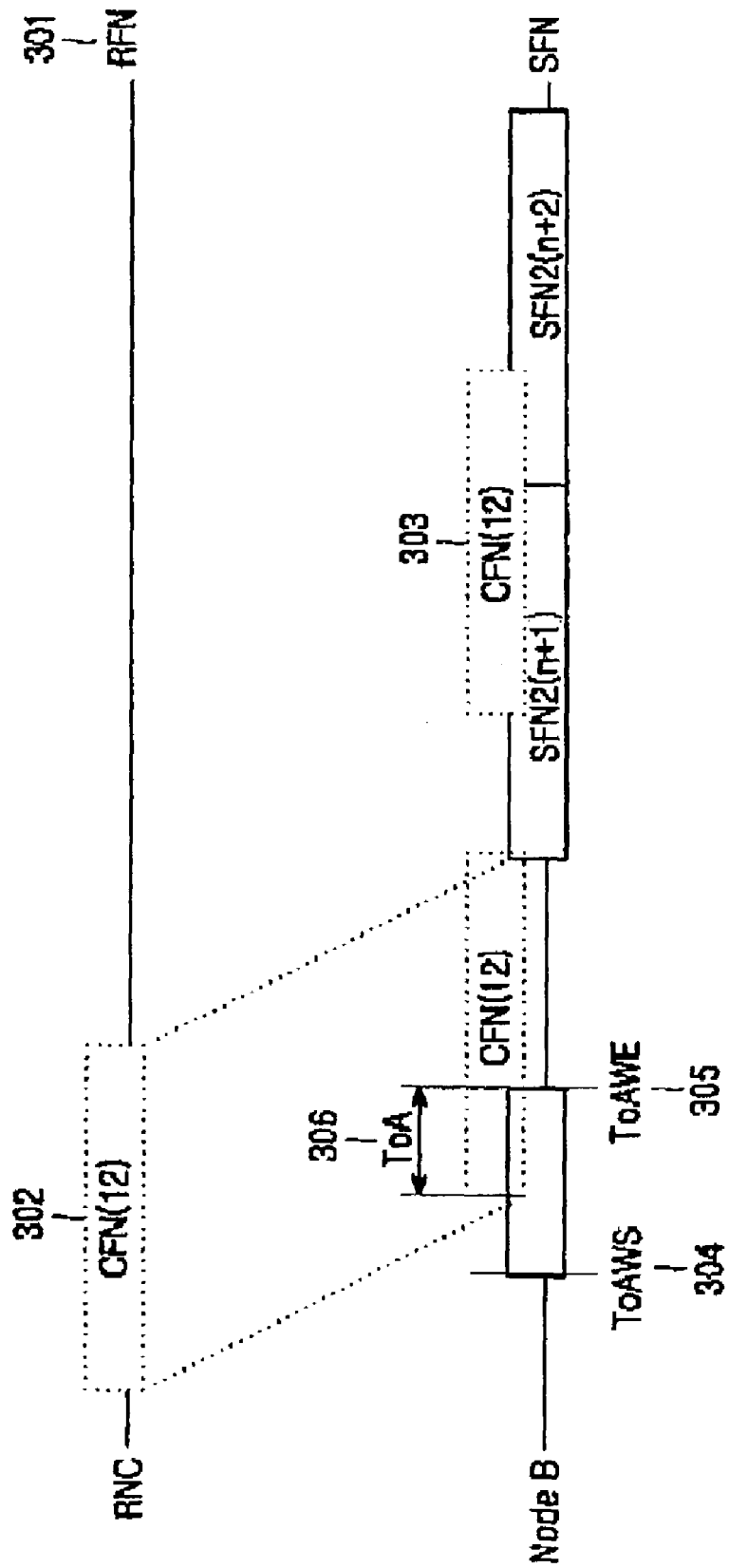
FIG. 3 illustrates a timing relationship in a user plane synchronization procedure between an RNC and a Node B according to an embodiment of the present invention.

Actually, the user plane synchronization is a process of determining a transmission time of an RNC, i.e., a time point on a timer RFN of the RNC where a corresponding data frame should be copied and transmitted, when the RNC desires to transmit its specific data frame to a UE at a scheduled SFN of a Node B. This process is described with reference to FIG. 3. In FIG. 3, reference numeral 301 represents timing of an RNC. Actually, the RNC desires to transmit CFN(12) for a specific time period of the Node B, represented by reference numeral 303. In order to make such transmission possible, a time point must be determined where the corresponding CFN(12) should be transmitted. Therefore, as represented by reference numeral 302, the RNC transmits timing information of CFN(12) to the Node B along with a DL synchronization message. The Node B previously sets ToAWS (Time of Arrival Window Start point) 304 and ToAWE (Time of Arrival Window End point) 305 by using a control signal. The arrival window is set to guarantee an optimal time for which a Node B receives a specific message and then performs stable retransmission on the corresponding message through an appropriate process. When a message transmitted by the RNC has arrived within a corresponding time period, the Node B calculates ToA (Time of Arrival) 306, a time difference between a time when the transmitted message arrived and the ToAWE 305. In this case, the ToA has a positive value. The calculated ToA is transmitted to the RNC, using a UL synchronization message. Based on the ToA in the UL synchronization message, the RNC determines that transmission is being accomplished normally, and then continuously performs data transmission.

When a message transmitted by the RNC arrives at the Node B after the ToAWE 306, the calculated ToA has a negative value, and the RNC advances transmission of CFN(12) based on the ToA, to thereby transmit the CFN(12) as represented by reference numeral 303. In the opposite case, i.e., when the message transmitted by the RNC arrives before the ToAWS 304, the calculated ToA is larger than the arrival window, and the RNC delays transmission of CFN (12) based on the ToA.

3-2. Second Embodiment (Measurement by Node B)

Next, a description of a procedure for performing soft handover in an asynchronous mobile communication system according to another embodiment of the present invention will be made in accordance with the above-stated steps.

First, a detailed description will be made of Step 1, i.e., measuring a Node B SFN-SFN observed time difference by a Node B to determine time information for Node Bs within one RNC, and delivering the measured Node B SFN-SFN observed time difference to the RNC.

Relative timing information between Node Bs measured by a Node B, i.e., a Node B SFN-SFN observed time difference, is defined by Equation (14) in a manner similar to the method of measuring an SFN-SFN observed time difference by a UE in the first embodiment.

Node $B$ SFN-SFN observed time difference=$T_{CPICHRxj}$-$T_{CPICHPRxi}$     Equation (14)

In Equation (14), $T_{CPICHRxi}$ represents a start point of a particular slot of a primary CPICH on a time axis of a Node B that measures the Node B SFN-SFN observed time difference, and $T_{CPICHRxj}$ represents a time point nearest to the $T_{CPICHRxi}$ among slot start points of a primary CPICH received from a cell of the counterpart Node B.

Referring to FIG. 2, reference numeral 206 corresponds to a Node B SFN-SFN observed time difference measured in the cell #1. Here, $T_{CPICHRxi}$ corresponds to a transmission start point of a slot #1 with SFN(3) on a time axis 208 of the cell #1, and $T_{CPICHRxi}$ corresponds to a reception start point of a slot #7 with SFN(15) among data blocks transmitted from the cell #2 on a time axis 209 of the cell #1. Another definition of the Node B SFN-SFN observed time difference will be given with reference to FIG. 2. The $T_{CPICHRxj}$ measured on the time axis 210 of the cell #2 represents a time when the cell #2 starts receiving a primary CPICH slot from the cell #1. Likewise, the $T_{CPIHRxi}$ represents a transmission start point of a primary CPICH slot transmitted by the cell #2 at a time point nearest to the $T_{CPICHRxj}$, on the time axis 211 of the cell #2. In the present invention, the two definitions can be used together. The two definitions provide the same measurement values, and reference numerals 206 and 207 of FIG. 2 correspond to the measurement values. A minimum unit of the Node B SFN-SFN observed time difference defined by Equation (14) is a chip, and its effective area can be defined as [−1280, . . . , 1279, 120].

Although a definition has been given of a Node B SFN-SFN observed time difference between CPICH slots, a definition of a Node B SFN-SFN observed time difference between CPICH frames can also be given. For the measurement of the Node B SFN-SFN observed time difference, a definition of a difference between frame start points can be given as Node $B$ SFN-SFN observed time difference
$T_{CPICHRxj}$-$T_{CPICHRxi}$     Equation (15)

In Equation (15), $T_{CPICHRxi}$ represents a start point of a particular frame of a primary CPICH on a time axis of a Node B that measures the Node B SFN-SFN observed time difference, and $T_{CPICHRxj}$ represents a time point nearest to the $T_{CPICHRxi}$ among frame start points of a primary CPICH received from a cell of the counterpart Node B. A minimum unit of the Node B SFN-SFN observed time difference defined by Equation (15) is a chip or a unit smaller than the chip, and its effective area can be defined as [−19200.0000, . . . ,19200.000] for the chip unit.

In the case of measurement by the Node B, each Node B can transmit reception power of CPICH from other Node Bs to the RNC along with the measurement value. The reason for transmitting the reception power information of CPICH is because when transmission power levels of CPICHs from the two cells are different from each other, a handover region may not be defined centering on a UE located at the same distance from the two cells. Generally, a handover region is defined centering on a place where reception power levels from two neighboring cells are identical to each other.

However, when transmission power levels from the two cells are different from each other, even though a UE is located at the same distance from the two cells, reception power levels of CPICHs received from the respective cells are different from each other. Although transmission power levels from the two cells are different, CPICH signals from the cells can be received at the same power at a UE located in a handover region. This means that although the UE is located in a handover region, it is located at different distances from the two cells. That is, it can be considered that the UE is located more closely to a cell having relatively lower transmission power. In this case, it is necessary that a cell having relatively lower transmission power preferentially transmit MBMS data rather than the two cells transmit the MBMS data at the same time point. Therefore, each Node B can transmit the reception power of CPICH of the counterpart cell to the RNC along with the measurement value.

A detailed description will now be made of Step 2, i.e., determining an MBMS offset to be delivered to each Node B depending on a relationship between SFN values calculated in Step 1, wherein measurement values calculated in Step 1 represent information on a relationship between time axis values (or SFNs) of respective Node Bs.

A description of the measurement-by-Node B method will be separately made with reference to when a Node B SFN-SFN observed time difference is defined as a time difference between CPICH slots, and when the Node B SFN-SFN observed time difference is defined as a time difference between CPICH frames. In addition, it is assumed that when the Node B SFN-SFN observed time difference is defined as the time difference between CPICH slots, an RNC already knows a transmission time difference of each Node B even on a slot basis through the Node synchronization procedure. Therefore, the RNC may additionally perform a process of elaborating synchronization between two Node Bs, the transmission time difference of which is already known even on a slot basis, through the measurement by the Node B.

FIG. 2 illustrates a timing relationship between different cells within two Node Bs, and an SFN-SFN observed time difference. The RNC receives a Node B SFN-SFN observed time difference acquired through the measurement by the Node B, from each Node B. For example, in FIG. 2, a cell #1 of a Node B#1 and a cell #2 of a Node B#2 are adjacent to each other, and the RNC receives the Node B SFN-SFN observed time difference from the Node B#1 and the Node B#2.

The first Node B 202 receives CPICH transmitted from the cell #2 of the second Node B 203, measures the SFN-SFN observed time difference 206, and transmits the resultant value to the RNC 201. The SFN-SFN observed time difference transmitted by the first Node B 202 will be defined as a first $SFN_{diff}$ 206. Likewise, the second Node B 203 receives CPICH transmitted from the cell #1 of the second Node B 202, measures the SFN-SFN observed time difference 207, and transmits the resultant value to the RNC 201. The SFN-SFN observed time difference transmitted by the second Node B 203 will be defined as a second $SFN_{diff}$ 207.

In FIG. 2, reference numeral 208 represents a transmission time SFN when the cell #1 starts transmission of a CPICH slot, and reference numeral 209 represents a time when the cell #1 starts receiving a CPICH slot from the cell #2. In addition, reference numeral 211 represents a transmission time SFN when the cell #2 starts transmission of a CPICH slot, and reference numeral 210 represents a time when the cell #2 starts receiving a CPICH slot from the cell #1.

Therefore, in FIG. 2, the first $SFN_{diff}$ measured by the first Node B 202 can be measured as a value represented by the reference numeral 206, while the second $SFN_{diff}$ measured by the second Node B 203 can be measured as a value represented by the reference numeral 207.

Because the RNC 201, as stated above, knows a timing relationship between the cell #1 and the cell #2 even on a slot basis, it can be assumed in FIG. 2 that the RNC 201 knows that a slot #1 of SFN(3) of the cell #1 is synchronized with a slot #7 of SFN(15) of the cell #2. Therefore, the RNC 201 can perform more elaborate transmission time synchronization by using the first $SFN_{diff}$ 206 measured and transmitted by the first Node B 202 and the second $SFN_{diff}$ 207 measured and transmitted by the second Node B 203.

In FIG. 2, the time axis 208 of the cell #1 and the time axis 211 of the cell #2 are out of synchronization with each other. That is, a slot #1 of SFN(3) on the time axis 208 is not correctly synchronized with a slot #7 of SFN(15) on the time axis 211. The slot #7 of SFN(15) goes ahead of the slot #1 of SFN(3) on the time axis. That is, reception of the slot #1 of SFN(3) by the cell #1 is started at the time when transmission of the slot #7 of SFN(15) by the cell #2 has been performed by about half.

The first $SFN_{diff}$ 206 and the second $SFN_{diff}$ 207 measured by the Node Bs and then transmitted to the RNC 201, can reflect a time difference between the slot #7 of SFN(15) from the cell #2 and the slot #1 of SFN(3) from the cell #1.

$$\text{Average1} = (\text{first } SFN_{diff} - \text{second } SFN_{diff})/2 \qquad \text{Equation (16)}$$

$$\text{Average2} = (\text{second } SFN_{diff} - \text{first } SFN_{diff})/2 \qquad \text{Equation (17)}$$

Defining Equation (16) and Equation (17), a relationship between transmission times of the Node Bs can be correctly described using the averages. That is, in the case of the cell #1, a transmission start point indicating a time point where the slot #7 of SFN(15) from the cell #2 was actually transmitted can be defined as "Start point of Slot #1 of SFN(3)+Average1." That is, in the case of FIG. 2, since Average1 has a negative value, the slot #7 of SFN(15) from the cell #2 starts, the Average1 value ahead of the slot #1 of SFN(3) from the cell #1.

Alternatively, from the viewpoint of the cell #2, compared with the slot #7 of SFN(15) from the cell #2, the slot #1 of SFN(3) form the cell #1 can be defined as "Start point of Slot 7 of SFN(15)+Average2." That is, in the case of FIG. 2, since Average2 has a positive value, the slot #7 of SFN(15) from the cell #2 starts, the Average2 value after the slot #1 of SFN(3) from the cell #1 202.

Therefore, the process of establishing a relationship between SFN of one Node B and CFN of transmission data and then establishing a relationship between SFN and CFN of the next Node B as described in conjunction with the first embodiment, can be described as a process of using the Average values.

Assume the relationship between the SFN and CFN of the cell #1 is set as $$\text{MBMS offset for Cell \#1} = (\text{Start point of Cell } \#1\text{-CFN}) = \text{OFF } 0 \times 38400 + \text{Chip\_offset} \qquad \text{Equation (18)}$$

A relationship between SFN and CFN of the cell #2 can be determined using the Average value as illustrated in Equation (18). In FIG. 2, the RNC 201, as assumed before, previously knows that synchronization between the slot #1 of SFN(3) from the cell #1 and the slot #7 of SFN(15) from the cell #2 was accomplished even on a slot basis in the relationship between the time axis 208 and the time axis 211.

That is, the RNC 201 knows that

Cell #2's transmission point − Cell #1' transmission point =

Slot #7 of $SFN$ (15) − Slot #1 of $SFN$ (3) = slot #6 + Frame #12 = 6 × 2560 + 12 × 38400 chips

However, information on the synchronization may have an error. Therefore, it is possible to acquire correct information on the synchronization on a chip basis by using the Average values. This is defined as Cell #2's transmission point −          Equation (19)

Cell #1's transmission point =

$6 \times 2560 + 12 \times 38400$ chips + $Average2 = 6 \times 2560 +$ $12 \times 38400$ chips + (second $SFN_{diff}$ − first $SFN_{diff}$)/2

Therefore, an MBMS offset value for the cell #2, i.e., a relational expression between CFN and a transmission point of the cell #2 can be given by $MBMS$ offset for Cell #2 =          Equation (20)

(Cell #2's transmission point − $CFN$) =

(Cell #2's transmission point −

Cell #1's transmission point) +

(Cell #1's transmission point − $CFN$) =

$(6 \times 2560 + 12 \times 38400$ chip +

(second $SFN_{diff}$ − first $SFN_{diff}$)/2) +

($OFF0 \times 38400$ + Chip_offset)

In conclusion, it can be understood from Equation (20) that if a relationship between a transmission point of a particular cell (cell #1 in Equation 20) and a CFN is determined, a relationship between a transmission point of another neighboring cell and CFN can be determined using a relationship between a transmission point of the particular cell (or cell #1) and CFN.

When the Node B SFN-SFN observed time difference is defined as a time difference between CPICH frames, it is assumed that the RNC already knows a transmission time difference of each Node B even on a frame basis through the Node synchronization procedure.

Therefore, the RNC can additionally perform a process of elaborating synchronization between two Node Bs, the transmission time difference of which is already known even on a frame basis, through the measurement by the Node B. A detailed description thereof is similar to the description of when the Node B SFN-SFN observed time difference is defined as a time difference between CPICH slots. The resulting expression is given by $MBMS$ offset for Cell #2 =          Equation (21)

-continued (Cell #2's transmission point − $CFN$) =

(Cell #2's transmission point −

Cell #1's transmission point) +

(Cell #1's transmission point − $CFN$) =

(Frame difference between Cell #2's transmission point and Cell #1's transmission point) +

(second $SFN_{diffFrame}$ − first $SFN_{diffFrame}$)/2 +

($OFF0 \times 38400$ + Chip_offset)

In Equation (21), it is assumed that the RNC already knows (Frame difference between Cell #2's transmission point and Cell #1's transmission point) through the Node synchronization procedure. In Equation (21), first $SFN_{diffFrame}$ and second $SFN_{diffFrame}$, i.e., an SFN-SFN observed time difference measured by each Node B, represent a difference value between a frame start point in a cell and a start point nearest to a frame start point in the cell among CPICH frames received from the counterpart cell. It is assumed in Equation (21) that a difference between a transmission point of the cell #1 and CFN is previously determined as (OFF0×38400+Chip_offset).

Step 3 and Step 4 in the second embodiment are identical to Step 3 and Step 4 in the first embodiment, so a detailed description thereof will not be provided again.

A detailed operation of the RNC, Node B, and UE according to the procedures stated above will now be described with reference to the accompanying drawings.

4. Operation in Embodiments 4-1. Operation in First Embodiment

Figure 5:
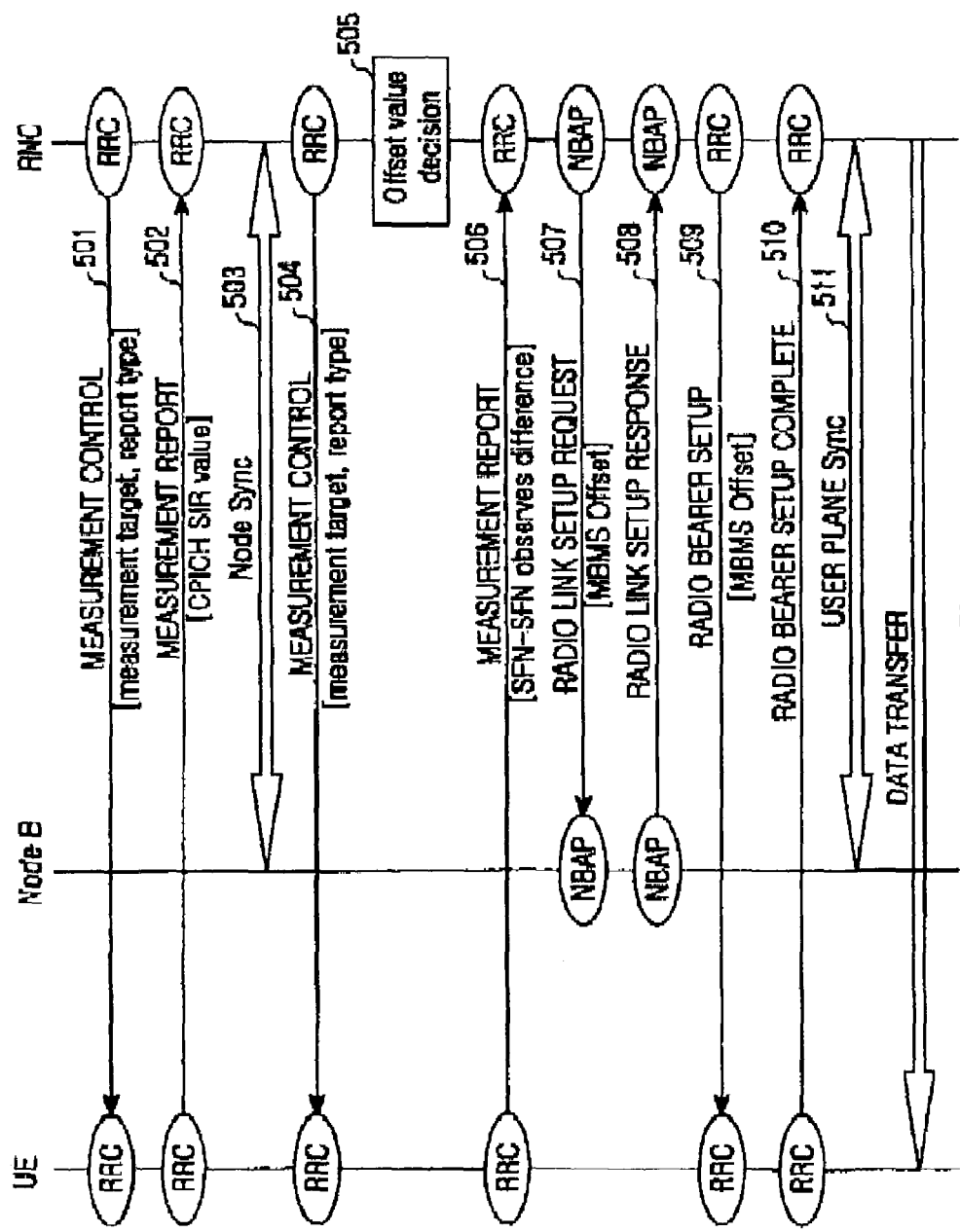
FIG. 5 is a signal flow diagram for transmission time synchronization of a Node B in an asynchronous CDMA mobile communication system according to an embodiment of the present invention.

FIG. 5 is a signal flow diagram illustrating a technique of synchronizing MBMS data transmission time by a Node B depending on a measurement value of a UE SFN-SFN observed time difference from a UE according to an embodiment of the present invention.

Referring to FIG. 5, an RNC sends a CPICH measurement request to a particular UE by using a Measurement Control RRC message in step 501. That is, the RNC selects a UE located in a handover region as a particular UE that will perform the measurement, and then sends a CPICH measurement request to the selected UE so that the UE performs a measurement operation. As described above, the RNC may select a particular UE and request the selected UE to perform a measurement operation. Alternatively, when measurement of an MBMS offset is required for determination of a data transmission time in a Node B during MBMS data transmission, an MBMS offset can be determined using statistic values of UE SFN-SFN time differences reported from several UEs. Therefore, it is not necessary to determine whether to perform handover on a particular UE. However, in order to send a measurement request to a particular UE, a UE located in a handover region is selected.

Upon receiving the Measurement Control RRC message, the UE measures, in step 502, a CPICH SIR value and transmits the measured CPICH SIR value to the RNC through a Measurement Report RRC message. The RNC receives the measured CPICH SIR value from the particular UE, and determines from the measured CPICH SIR value whether the particular UE is located in a handover region. If it is determined that the particular UE is located in a handover region, the RNC can perform in step 503 a Node synchronization procedure in order to acquire timing information of a Node B related to handover of the particular UE. The Node synchronization procedure can be performed in this step, or independently performed regardless of MBMS offset determination for MBMS data transmission time determination in a Node B. That is, the Node synchronization process can be performed before a measurement process for MBMS offset determination. The RNC can acquire timing information of the Node B through the Node synchronization procedure with accuracy of about 0.125 ms.

In the Node synchronization procedure, the RNC transmits its own timing information and RFN(T1) to a corresponding Node B through a DL Node synchronization message. The corresponding Node B includes a process of transmitting to the RNC a UL Node synchronization message including timing information (T2 expressed as BFN) indicating a time when the DL Node synchronization message arrived, and timing information (T3) indicating a time when the UL Node synchronization message is transmitted.

In step 504, the RNC transmits a Measurement Control RRC message set to request measurement of an SFN difference, to the UE located in a handover region. Upon receiving the Measurement Control RRC message, the UE measures a UE SFN-SFN observed time difference, and then transmits in step 505 the measured UE SFN-SFN observed time difference to the RNC through a Measurement Report message. The RNC then calculates an MBMS data transmission time offset value between related Node Bs, by using the UE SFN-SFN observed time difference from the UE and the SFN-SFN observed time difference measured through the Node synchronization procedure. As described above, based on a reference cell (or Node B) whose data transmission frame, or whose data transmission time falls most behind, a difference between SFNs measured for respective Node Bs by a UE and SFN of the reference cell is set as an MBMS offset value of a corresponding cell.

In step 507, the RNC transmits the calculated MBMS offset value to a corresponding Node B by using an NBAP message such as a Radio Link Setup Request message. Upon receiving the MBMS offset value from the RNC, the Node B prepares to determine a multimedia data transmission time according to the received MBMS offset value, and transmits in step 508 a Radio Link Setup Response message to the RNC in response to the Radio Link Setup Request message.

In step 509, the RNC informs the UE of the determined MBMS offset value by using a Radio Bearer Setup message or a Radio Bearer Setup RRC message. The UE normally receives the MBMS offset value from the RNC, and transmits in step 510 a Radio Bearer Setup Complete message to the RNC after setup or reset for a corresponding radio bearer for multicast or broadcast is completed. If transmission time synchronization due to soft handover is accomplished on the Node B and the UE based on the MBMS offset value, in step 511 a user plane synchronization procedure is performed between the RNC and the Node B. The user plane synchronization procedure is performed using a DL synchronization message, including CFN for a particular data frame, and a UL synchronization message including ToA for indicating a difference between a time point where a transmission data frame arrived at the Node B and ToAWE, and CFN included in the received data frame. Such a user plane synchronization procedure is performed to synchronize data frame transmission points finally, the RNC, after receiving the Radio Link Setup Response message from the Node B and the Radio Bearer Setup Complete message from the UE, starts transmitting MBMS multimedia streaming data through a radio bearer for multicast or broadcast after the user plane synchronization is completed.

Figure 6:
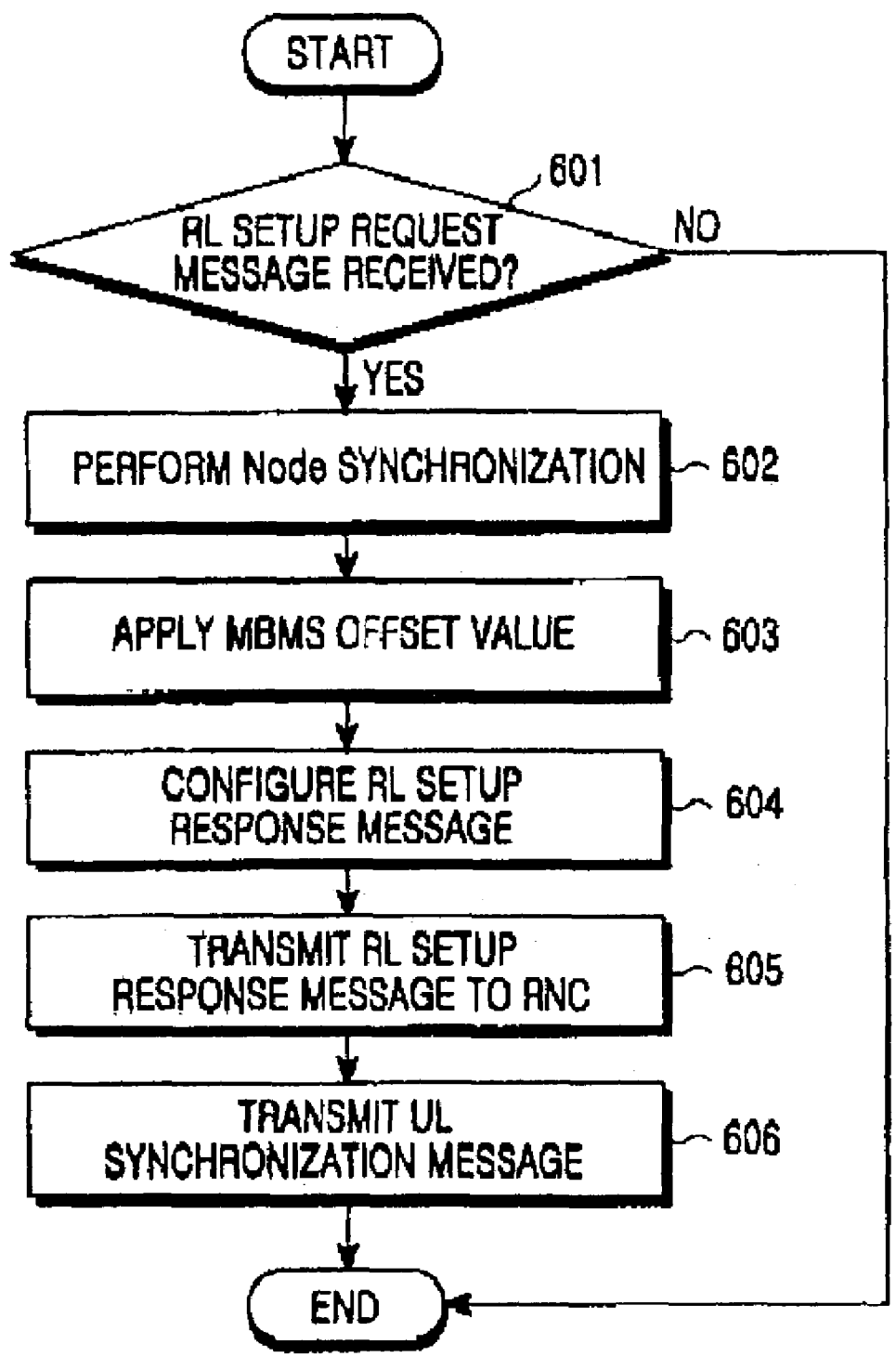
FIG. 6 is a flowchart illustrating an operation of the Node B in the signal flow diagram of FIG. 5.
Figure 7:
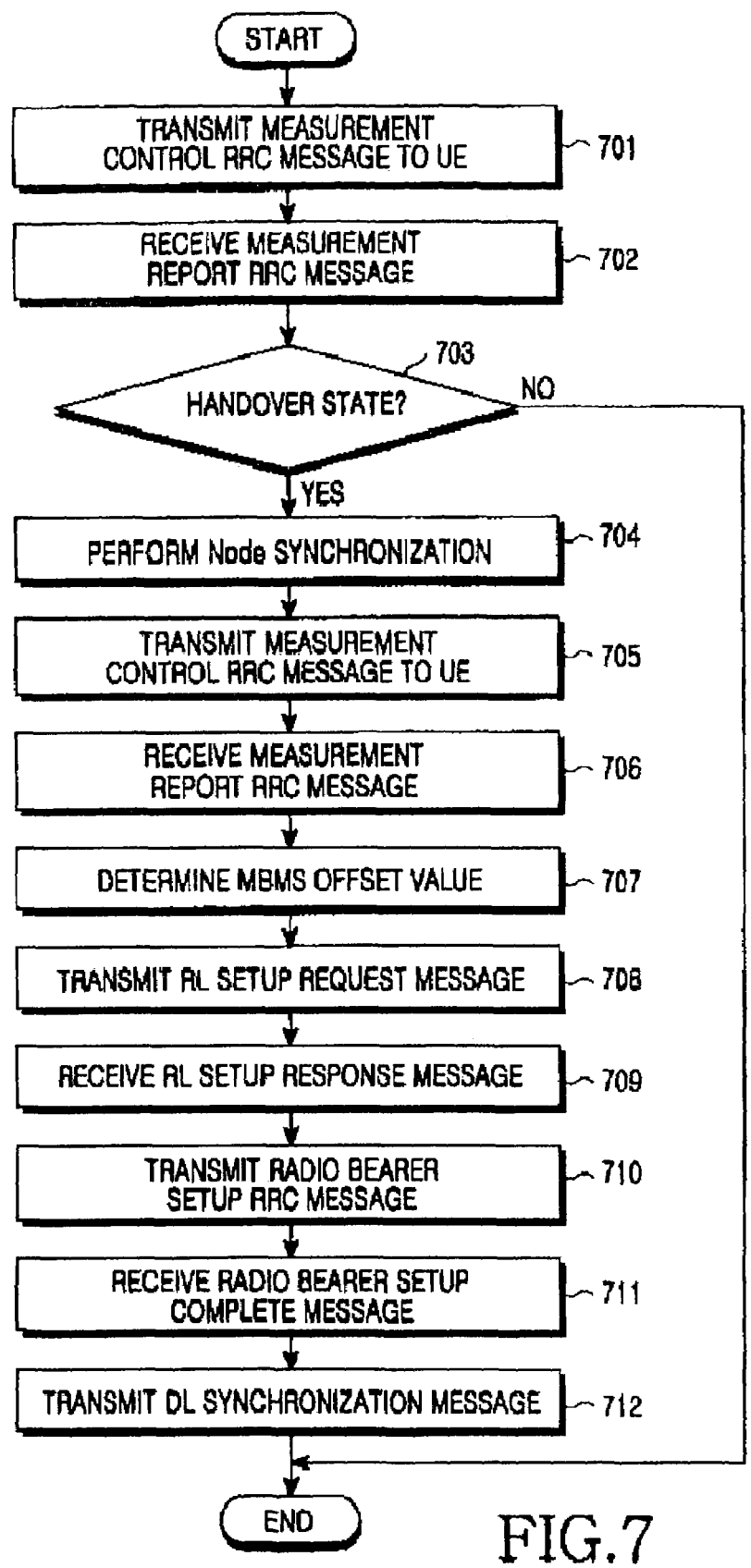
FIG. 7 is a flowchart illustrating an operation of the RNC in the signal flow diagram of FIG. 5.
Figure 8:
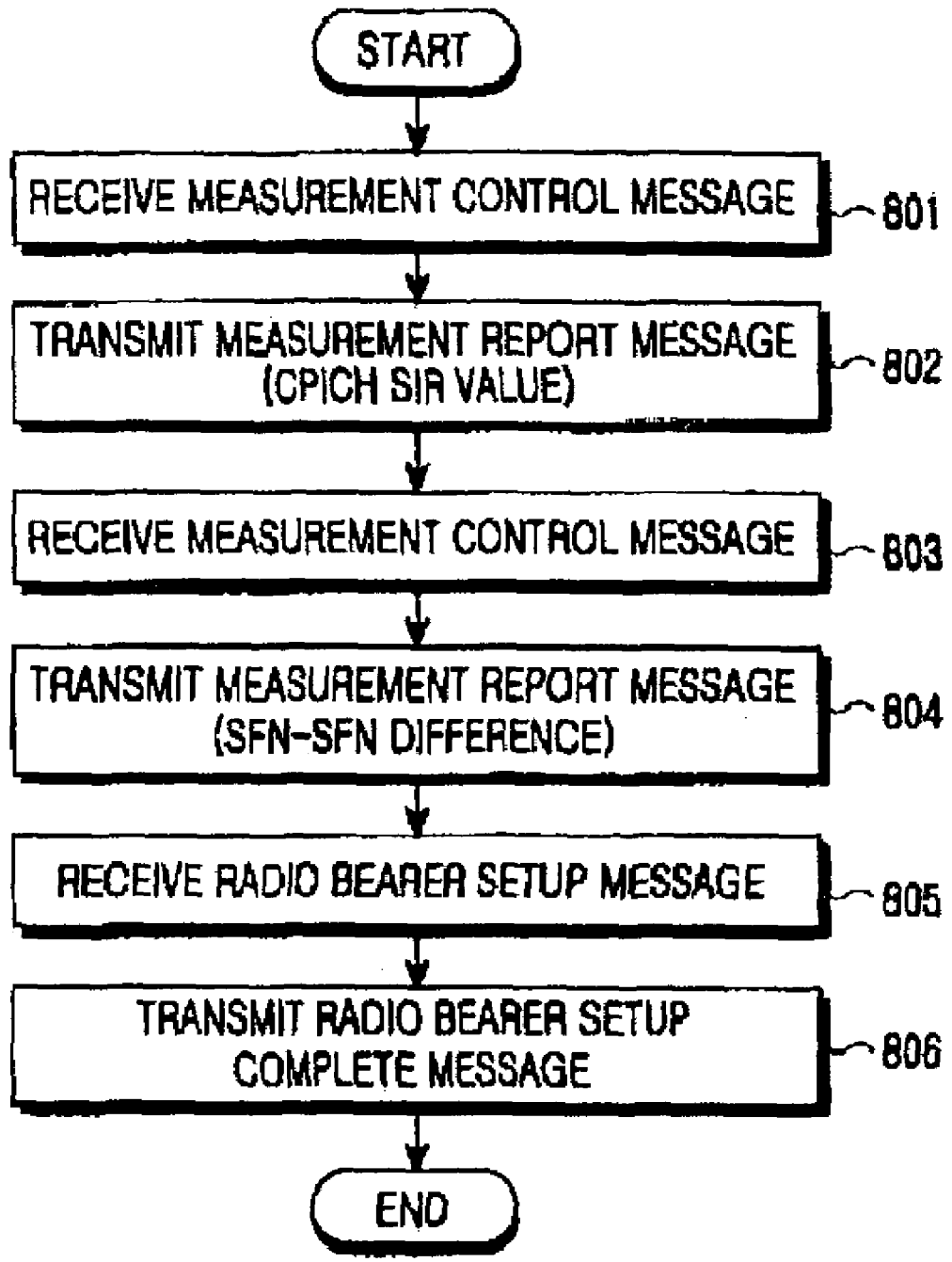
FIG. 8 is a flowchart illustrating an operation of the UE in the signal flow diagram of FIG. 5.

FIGS. 6 to 8 are flowcharts illustrating operations of the Node B, RNC, and UE, respectively, according to an embodiment of the present invention, respectively.

An operation of the Node B will first be described with reference to FIG. 6. In step 601, the Node B determines whether a Radio Link Setup Request message is received from an RNC. If the Radio Link Setup Request message is received, in step 602 the Node B receives a DL Node synchronization message from the RNC and then performs successive operations for a Node synchronization procedure to inform the RNC of its timing information by using a UL Node synchronization message. In step 603, the Node B extracts an MBMS offset value from the received Radio Link Setup Request message and applies the extracted MBMS offset value to a Node B transmission time setting process for corresponding multimedia streaming. After completing a reconfiguration process on a radio link for an MBMS service according to the received MBMS offset value, the Node B configures a Radio Link Setup Response message for information transfer in step 604. Thereafter, in step 605, the Node B transmits the configured Radio Link Setup Response message to the RNC, thereby informing the RNC of completion of the Node B transmission time setting process for corresponding multimedia streaming. Finally, in step 606, the Node B transmits a UL synchronization message including ToA and received CFN information to the RNC, for frame synchronization between the RNC and the Node B. Meanwhile, the Node B performs a user plane synchronization procedure, and then transmits MBMS data received from the RNC at a time determined according to the MBMS offset value determined by the RNC.

Next, an operation of the RNC will be described with reference to FIG. 7. In step 701, the RNC transmits a Measurement Control RRC message to a UE. The Measurement Control RRC message is a message set to enable a corresponding UE to measure a CPICH SIR value. In step 702, the RNC receives a Measurement Report RRC message including a CPICH SIR value measured by the UE. In step 703, the RNC determines from the received CPICH SIR value whether the UE that transmitted the Measurement Report RRC message is located in a handover region. If handover for the UE is required, in step 704 the RNC transmits a DL Node synchronization message to the Node B in order to acquire timing information of a Node B related to the handover. Further, the RNC performs a Node synchronization procedure by receiving a UL Node synchronization message with timing information from the Node B. In addition, in step 705 the RNC transmits a Measurement Control message to the UE located in the handover region so that the UE measures an SFN-SFN observed time difference. In step 706, the RNC receives a Measurement Report message including the SFN-SFN observed time difference measured by the UE. In step 707, the RNC determines an MBMS offset value of each cell by using the received SFN-SFN observed time difference and the SFN-SFN observed time difference measured through the Node synchronization process. In step 708, the RNC transmits the calculated MBMS offset value to a corresponding Node B, using a Radio Link Setup Request NBAP message. The Node B determines a transmission time for MBMS multimedia streaming by applying the MBMS offset value from the RNC. If the MBMS data transmission time is determined, the Node B transmits a Radio Link Setup Response message to the RNC. In step 709, the RNC receives the Radio Link Setup Response message transmitted from the Node B. In step 710, the RNC transmits the MBMS offset value to a corresponding UE along with a Radio Bearer Reconfiguration RRC message. Upon receiving the MBMS offset value, the UE prepares to receive an MBMS service. If the preparation for receiving the MBMS service is completed, the UE informs the RNC of completion of the preparation for receiving the MBMS service by using a Radio Bearer Setup Complete message. In step 711, the RNC receives from the UE the Radio Bearer Setup Complete message as a setup or reset complete message for a corresponding radio bearer. Finally, in step 712, the RNC transmits a DL synchronization message with CFN to the Node B, for frame synchronization with the Node B. In addition, the RNC receives from the Node B a UL synchronization message including ToA and received CFN information. The RNC can perform user plane synchronization through ToA of the received UL synchronization message. After performing the user plane synchronization, the RNC transmits MBMS data at a transmission time determined according to the MBMS offset value.

Finally, an operation of the UE will be described with reference to FIG. 8. In step 801, the UE receives a Measurement Control message from a corresponding RNC. If the Measurement Control message is received, in step 802 the UE measures a CPICH SIR value according information set in the Measurement Control message, and then transmits the measured CPICH SIR value to the corresponding RNC by using a Measurement Report RRC message. If the RNC determines from the CPICH SIR value that the UE is located in a handover region, the UE receives from the RNC a Measurement Control RRC message for requesting measurement of an SFN-SFN observed time difference, in step 803. The UE measures an SFN-SFN observed time difference in response to the Measurement Control RRC message, and then informs, in step 804, the RNC of the measured SFN-SFN observed time difference by using a Measurement Report RRC message. The RNC then determines an MBMS offset value by the SFN-SFN observed time difference from the UE, and transmits the determined MBMS offset value to the UE along with a Radio Link Reconfiguration message. In step 805, the UE receives the Radio Bearer Setup message with the MBMS offset value. If the MBMS offset value transmitted by the RNC is normally received, in step 806, the UE informs the RNC of the normal receipt of the MBMS offset value by using a Radio Bearer Setup Complete message, thus completing the preparation for receiving an MBMS service. Thereafter, the UE controls a reception data frame start point for data streaming transmitted from the Node B by using the received MBMS offset value, thereby minimizing a loss of received data and enabling soft combining.

4-2. Operation in Second Embodiment

The present invention also provides a technique for synchronizing transmission time for MBMS service streaming in a Node B by using an SFN-SFN observed time difference calculated through a Node synchronization process and an SFN-SFN observed time difference measured by the Node B. The Node B transmission time synchronization technique refers to a method of using an SFN-SFN observed time difference measured by a Node B instead of an SFN-SFN observed time difference measured by a UE, and a brief description thereof will be made herein below.

In the second embodiment of the present invention, an RNC performs a Node synchronization process in order to acquire timing information for several Node Bs. Through this process, the RNC can acquire timing information of the Node B with accuracy of about 0.125 ms. Thereafter, the RNC transmits an SFN-SFN observed time difference measured by each Node B, using a Common Measurement Initiation Request NBAP message. The RNC calculates an MBMS offset value for all Node Bs in a multicast group based on the SFN-SFN observed time difference measured and transmitted by the Node Bs and the SFN-SFN observed time difference calculated through the Node synchronization process. The RNC calculates a chip-based MBMS offset value for each Node B depending on the received SFN-SFN observed time difference values, in the following manner.

First, a Node B whose data transmission frame, or whose transmission time falls most behind, is set as a reference Node B. Thereafter, the RNC calculates a difference between an SFN-SFN observed time difference measured by the reference Node B and an SFN-SFN observed time difference measured by each Node B, and determines an average value of the difference as an MBMS offset value for a corresponding Node B. The reason for selecting the method of delaying a transmission time of an individual Node B based on a reference Node B whose data transmission time falls most behind is to reduce a data loss, which may occur when a data transmission time is advanced. Thereafter, the RNC performs a user plane synchronization process on each cell by using a frame protocol, and then transmits MBMS data streaming according to the MBMS offset value for an individual cell determined in the previous step.

The second embodiment enables not only synchronization between Node Bs related to handover of a particular UE, but also synchronization among all Node Bs included in a multicast region within a single Node B.

Figure 9:
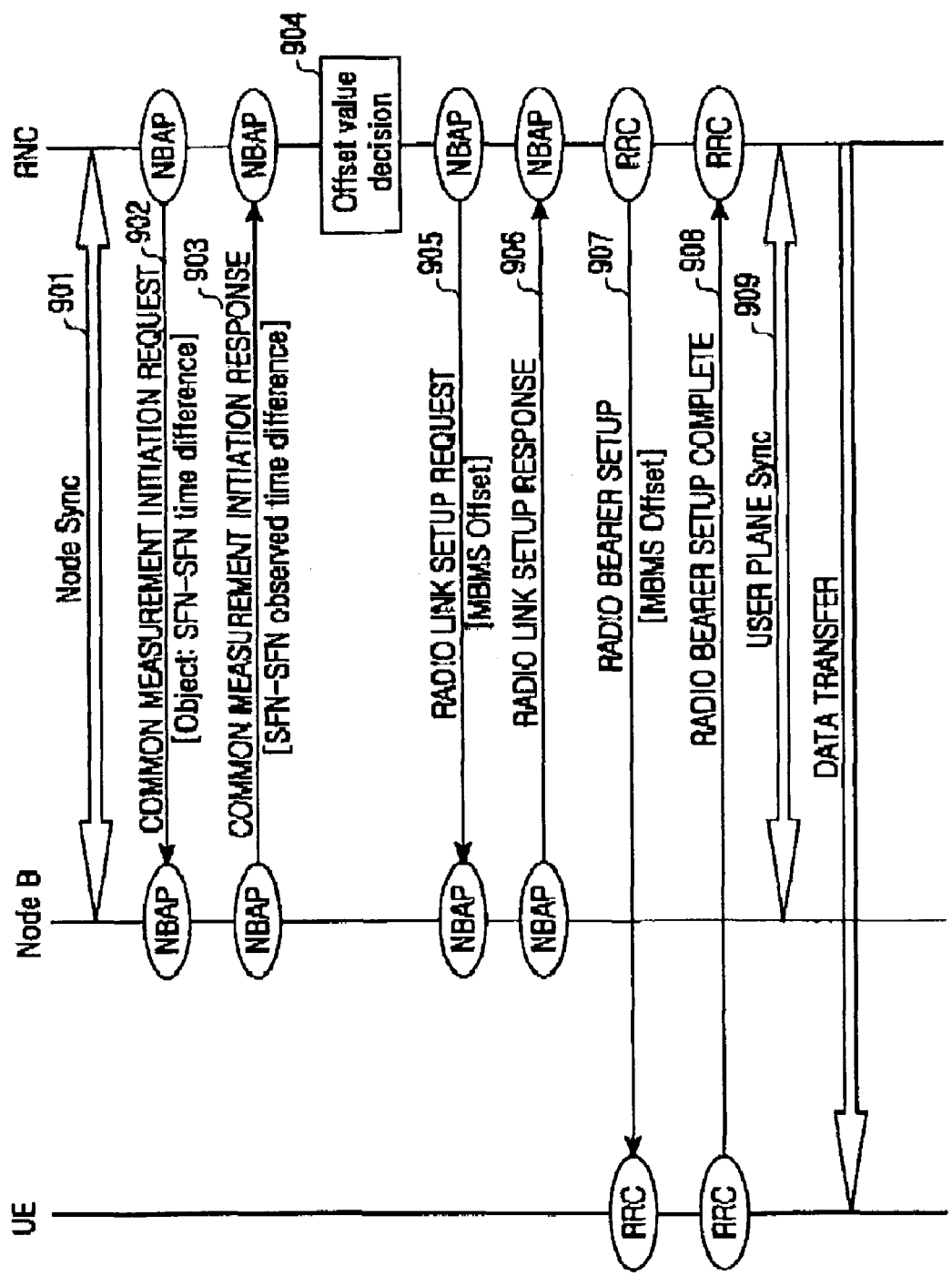
FIG. 9 is a signal flow diagram for transmission time synchronization of a Node B in an asynchronous CDMA mobile communication system according to another embodiment of the present invention.

FIG. 9 is a signal flow diagram illustrating a technique for synchronizing Node B transmission time based on a measurement value of a Node B SFN-SFN observed time difference from a Node B according to another embodiment of the present invention. Referring to FIG. 9, an RNC performs a Node synchronization procedure in step 901, in order to acquire timing information of a Node B related to handover. The RNC can acquire timing information of a corresponding Node B through the Node synchronization procedure with accuracy of about 0.125 ms. In the Node synchronization procedure, the RNC transmits its own timing information and RFN(T1) to a corresponding Node B along with a DL Node synchronization message. The Node B includes a process of transmitting to the RNC a UL Node synchronization message including timing information (T2 expressed as BFN) indicating a time when the DL Node synchronization message arrived, and timing information (T3) indicating a time when the UL Node synchronization message is transmitted. If the Node synchronization procedure is completed, the RNC orders all Node Bs to measure an SFN-SFN observed time difference by transmitting a Common Measurement Initiation Request NBAP message, in step 902. Upon receiving the Common Measurement Initiation Request NBAP message from the RNC, each Node B measures an SFN-SFN observed time difference. If measurement of the SFN-SFN observed time difference is completed, the Node B transmits the measured SFN-SFN observed time difference to the RNC.

In step 903, the RNC receives a Common Measurement Initiation Response message including the SFN-SFN observed time differences measured by all Node Bs. The RNC calculates an MBMS offset for each Node B based on the received Common Measurement Initiation Response message. That is, in step 904, the RNC calculates an MBMS offset value for each Node B based on an SFN-SFN observed time difference calculated through the Node synchronization process and an SFN-SFN observed time difference measured and transmitted by the Node B.

In step 905, the RNC transmits the calculated MBMS offset value to the corresponding Node B, using an NBAP message such as a Radio Link Setup Request message. Of course, as described above, the RNC may transmit information on an MBMS offset value among several Node Bs to all of the several cells. This is, because even a cell where MBMS data is not current transmitted can determine a transmission time of MBMS data depending on an MBMS offset value, the RNC may transmit a previously determined MBMS offset to several cells. Of course, the method for transmitting an MBMS offset from the RNC to a Node B or a UE can be modified in terms of an NBAP message and an RRC message. In addition, the MBMS offset can be transmitted either sequentially or simultaneously to the Node B and the UE.

The Node B, after receiving the MBMS offset value from the RNC, determines a multimedia data transmission time according to the received MBMS offset value. If the MBMS data transmission is determined, in step 906 the Node B transmits a Radio Link Setup Response message to the RNC. In step 907, the RNC informs the UE of the determined MBMS offset value by using a Radio Bearer Setup message or a Radio Bearer Setup RRC message. If the MBMS offset value is normally received, the UE performs transmission time setting or resetting on a corresponding radio bearer for multicast or broadcast. If the transmission time setting or resetting is completed, the UE transmits a Radio Bearer Setup Complete message to the RNC in step 908. In step 909, the RNC performs a user plane synchronization procedure with the Node B. In the user plane synchronization procedure, a DL synchronization message including CFN for a particular data frame, and a UL synchronization message including ToA indicating a difference between a time point where a transmission data frame arrived at the Node B and ToAWE, and CFN included in the received data frame, are used between the RNC and the Node B. Such a user plane synchronization procedure is performed to synchronize data frame transmission points. Finally, the RNC, after receiving the Radio Link Setup Response message from the Node B and the Radio Bearer Setup Complete message from the UE, starts transmitting MBMS multimedia streaming data through a radio bearer for multicast or broadcast.

Figure 10:
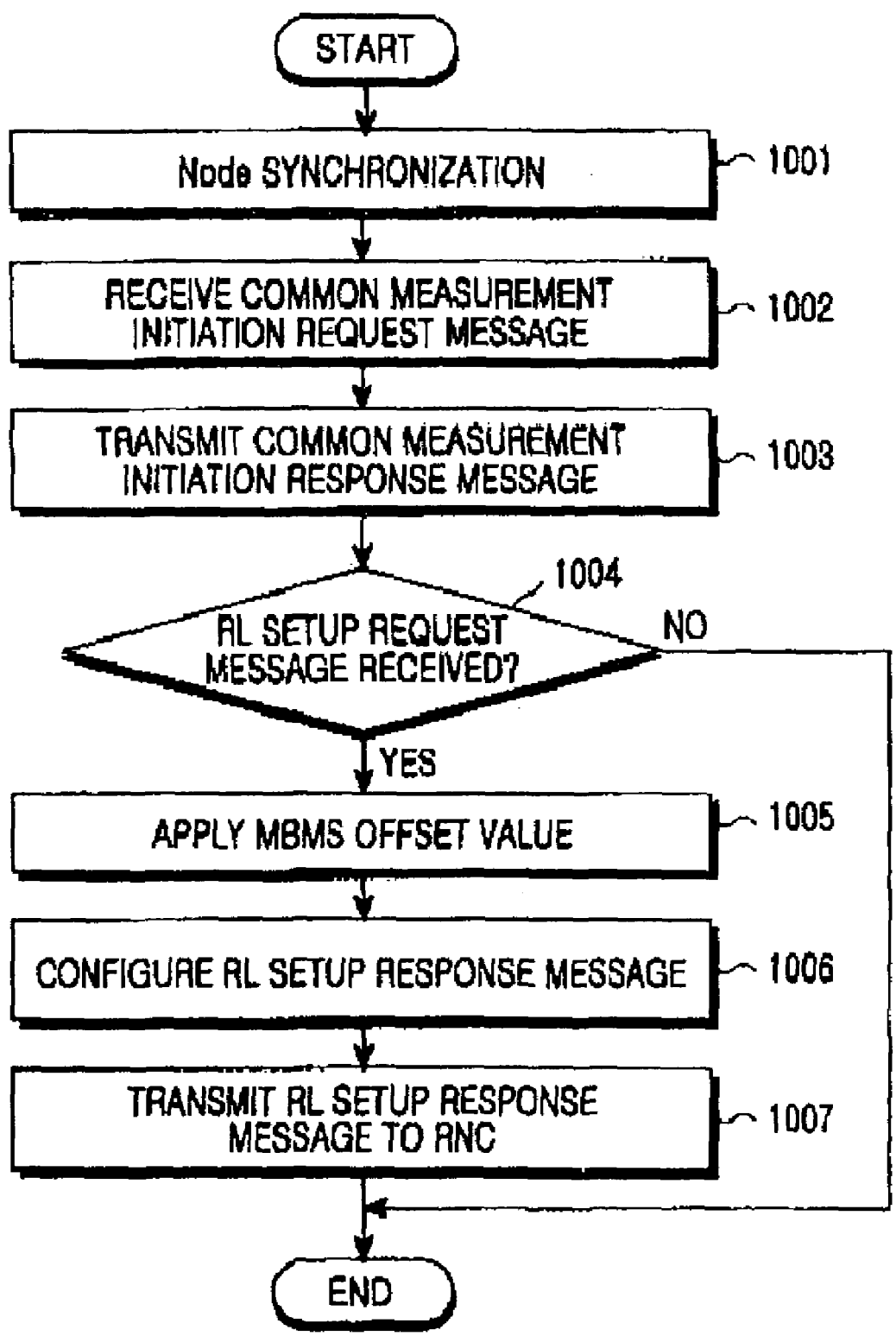
FIG. 10 is a flowchart illustrating an operation of the Node B in the signal flow diagram of FIG. 9.
Figure 11:
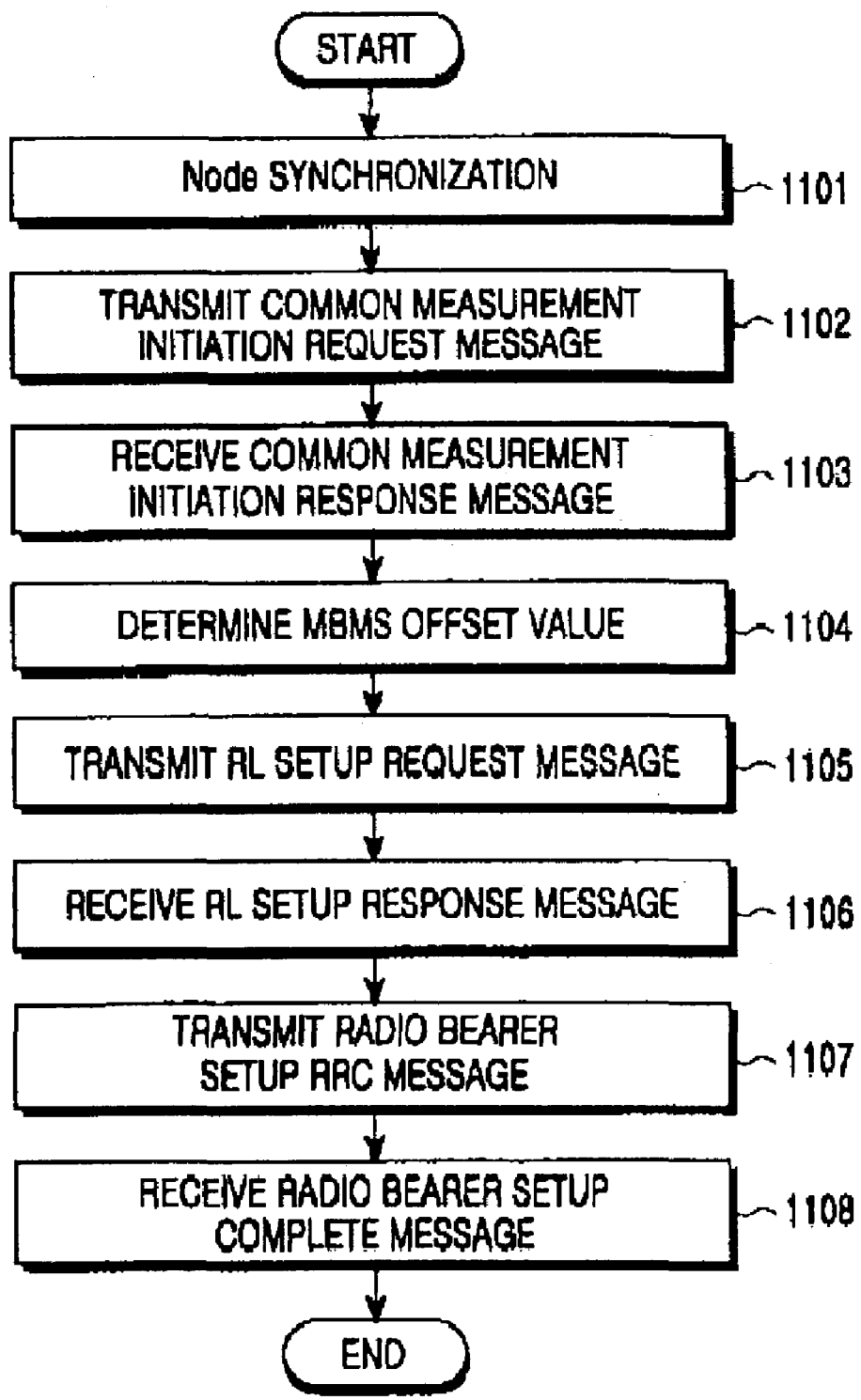
FIG. 11 is a flowchart illustrating an operation of the RNC in the signal flow diagram of FIG. 9.
Figure 12:
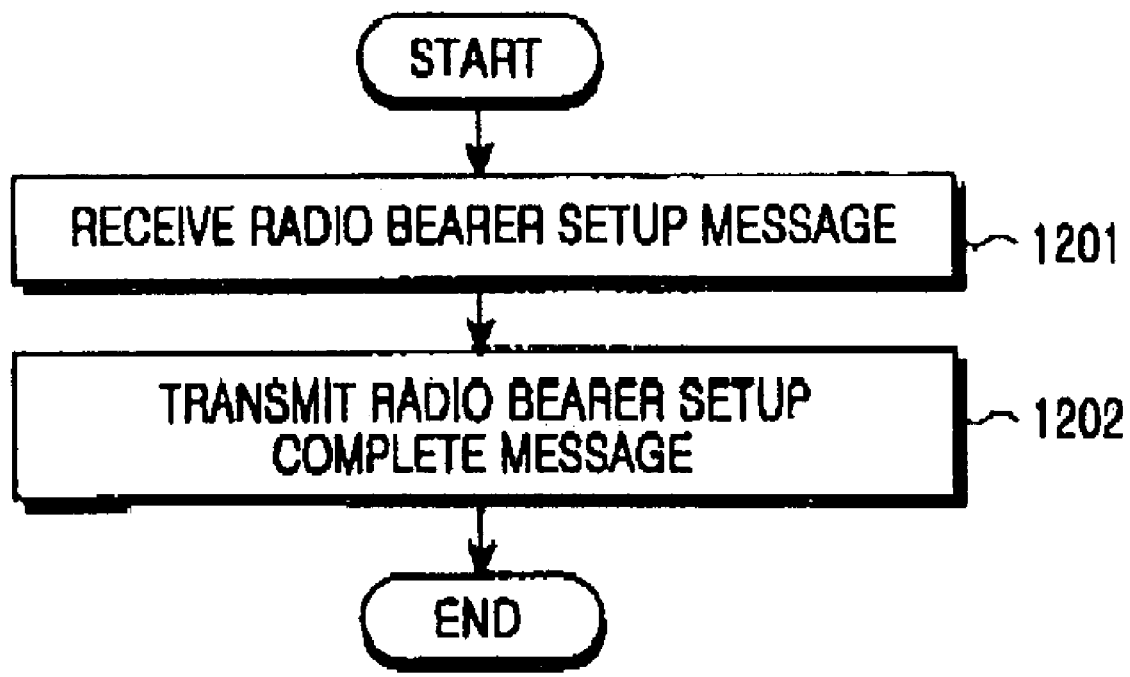
FIG. 12 is a flowchart illustrating an operation of the UE in the signal flow diagram of FIG. 9.

FIGS. 10 to 12 are flowcharts illustrating operations of the Node B, RNC, and UE, respectively, according to another embodiment of the present invention, respectively.

First, an operation of the Node B will be made with reference to FIG. 10. In step 1001, the Node B performs a Node synchronization procedure with an RNC. If the Node synchronization procedure is complete, in step 1002 the Node B receives a Common Measurement Initiation Request message from the RNC. The received Common Measurement Initiation Request message is a message set to measure an SFN-SFN observed time difference between Node Bs. The Node B measures an SFN-SFN observed time difference between neighboring Node Bs and transmits the measured SFN-SFN observed time difference to the RNC along with a Common Measurement Initiation Response message in step 1003. In step 1004, the Node B determines whether a Radio Link Setup Request message is received from the RNC. If it is determined in step 1004 that the Radio Link Setup Request message is received, in step 1005 the Node B extracts an MBMS offset value determined by the RNC from the received Radio Link Setup Request message, and then applies the extracted MBMS offset value to a Node B transmission time determination process for corresponding multimedia streaming. The Node B configures a Radio Link Setup Response message in step 1006, and then transmits the configured Radio Link Setup Response message to the RNC in step 1007, thereby informing the RNC of completion of the Node B transmission time determination process for corresponding multimedia streaming.

Next, an operation of the RNC will be described with reference to FIG. 11. In step 1101, the RNC performs a Node synchronization procedure with predetermined Node Bs. In step 1102 the RNC transmits a Common Measurement Initiation Request NBAP message to the Node Bs. The transmitted NBAP message is a message set to request a Node B receiving the corresponding message to measure an SFN-SFN observed time difference between its neighboring Node Bs. The Node Bs, after receiving the Common Measurement Initiation Request NBAP message, measure an SFN-SFN observed time difference and then transmit the measured SFN-SFN observed time difference to the RNC through a Common Measurement Initiation Response message. In step 1103, the RNC receives the SFN-SFN observed time difference measured by the Node B through the Common Measurement Initiation Response message. In step 1104, the RNC determines an MBMS offset value depending on the received SFN-SFN observed time difference measurement value. In step 1105, the RNC transmits the determined MBMS offset value to the Node B by using an NBAP message such as a Radio Link Setup Request message. The Node B then sets up or resets a multimedia radio bearer according to the received MBMS offset value. If the setup or reset is completed, the Node B transmits a Radio Link Setup Response message to the RNC, and the RNC receives the Radio Link Setup Response message in step 1106. The RNC transmits the MBMS offset value to a UE through a Radio Bearer Setup RRC message in step 1107, and receives a setup or reset complete message for a corresponding radio bearer for an MBMS service in step 1108.

Finally, an operation of the UE will be described with reference to FIG. 12. In step 1201, the UE receives an MBMS offset value determined by an RNC through a Radio Bearer Setup message. After setting up or resetting a radio bearer according to the received MBMS offset value, in step 1202 the UE informs, the RNC of completion of setting up or resetting a corresponding radio bearer by using a Radio Bearer Setup Complete message, thereby completing preparation for receiving an MBMS service.

4-3. Other Examples of the First Embodiment

In the present invention, a Node B MBMS data transmission time synchronization technique uses an SFN-SFN observed time interference calculated by the chip by a UE located in a handover region by extracting SFN from CPICH transmitted from each Node B. It is determined that a UE enters the handover region, if there are two or more radio links having a CPICH SIR value higher than a predetermined value (see 3GPP specification TS25.101 chap 8.7.1, 8.7.2) by using a Measurement Control RRC message set to measure a separate CPICH SIR value. An RNC transmits a Measurement Control RRC message set to request measurement of an SFN difference, to the UE located in a handover region, to thereby receive an SFN-SFN observed time difference measurement value between related cells through a Measurement Report RRC message. The RNC determines an MBMS offset value of an individual cell depending on a received UE SFN-SFN observed time difference measurement value in accordance with the above-described formulas. The RNC transmits the determined SFN correction value to a corresponding UE, using an RRC message. Thereafter, the RNC performs a user plane synchronization process on an individual cell by using a frame protocol, and then transmits MBMS data streaming according to the SFN correction value of an individual cell determined in the previous step. A UE that will measure the UE SFN-SFN observed time difference can be determined based on the CPICH measurement report by the Node B as stated above. The number of the determined UEs can be one or more. The UE SFN-SFN observed time difference received from the determined UE is statistically calculated, and can be used to determine a UE SFN-SFN observed time difference to be used for the Node B transmission time synchronization. In addition, even when an MBMS offset is determined by statistically calculating SFN-SFN observed time differences received from several UEs, the determined MBMS offset is calculated for several cells and then transmitted to the several cells.

For example, it is assumed that when the number of the determined UEs is N, a UE SFN-SFN observed time difference received from the each UE is defined as UE SFN-SFN observed time difference(i). Further, it is assumed that the parameter i has a value of 1 to N, and the UE SFN-SFN observed time difference(i) represents a UE SFN-SFN observed time difference measurement value received from an $i^{th}$ UE. In this case, the statistically determined UE SFN-SFN observed time difference value can be determined by UE SFN-SFN observed time difference=1/N×[UE SFN-SFN observed time difference(1)+UE SFN-SFN observed time difference(2)+ . . . +UE SFN-SFN observed time difference(N)]  Equation (22)

As another method, the RNC statistically stores information on the UE SFN-SFN observed time differences transmitted from UEs that perform handover between the two cells using dedicated channels, and then transmits MBMS data using the statistic values stored therein without additional measurement by the UEs.

The RNC continuously stores information on the UE SFN-SFN observed time differences transmitted when one UE performs handover between a cell #1 and a cell #2. Specifically, when one UE is handed over between the cell #1 and the cell #2, the UE measures the UE SFN-SFN observed time difference or a UE CFN-SFN observed time difference and then transmits the measurement value to the RNC. The UE CFN-SFN observed time difference represents a difference CFN of data transmitted from a cell (e.g., the cell #1) to which a radio link is currently set up, and SFN of the cell #2 to which a radio link is to be added, and SFN of the cell #1 and SFN of the cell #2 can be obtained by using CFN and SFN of the cell #1. Therefore, the UE CFN-SFN observed time difference can be analyzed as information on the UE SFN-SFN observed time difference. Once the UE SFN-SFN observed time difference information is received from one UE, the RNC can modify information on the existing UE SFN-SFN observed time difference as given by UE SFN-SFN observed time difference(Statistic 0)=t×(UE SFN-SFN observed time difference (Statistic 1))+(1−t)×(UE SFN-SFN observed time difference(new))  Equation (23)

In Equation (23), 't' has a value between 0 and 1, and can be determined by the RNC. The UE SFN-SFN observed time difference(new) represents the received UE SFN-SFN observed time difference, and the UE SFN-SFN observed time difference(Statistic 1) represents the previously stored UE SFN-SFN observed time difference. As a result, the RNC can obtain a UE SFN-SFN observed time difference(Statistic 0) and a Node B stores the UE SFN-SFN observed time difference(Statistic 0) as a UE SFN-SFN observed time difference. The stored UE SFN-SFN observed time difference can be used as a UE SFN-SFN observed time difference value in the Node synchronization process for an MBMS service.

5. Node B Transmitter

Figure 13:
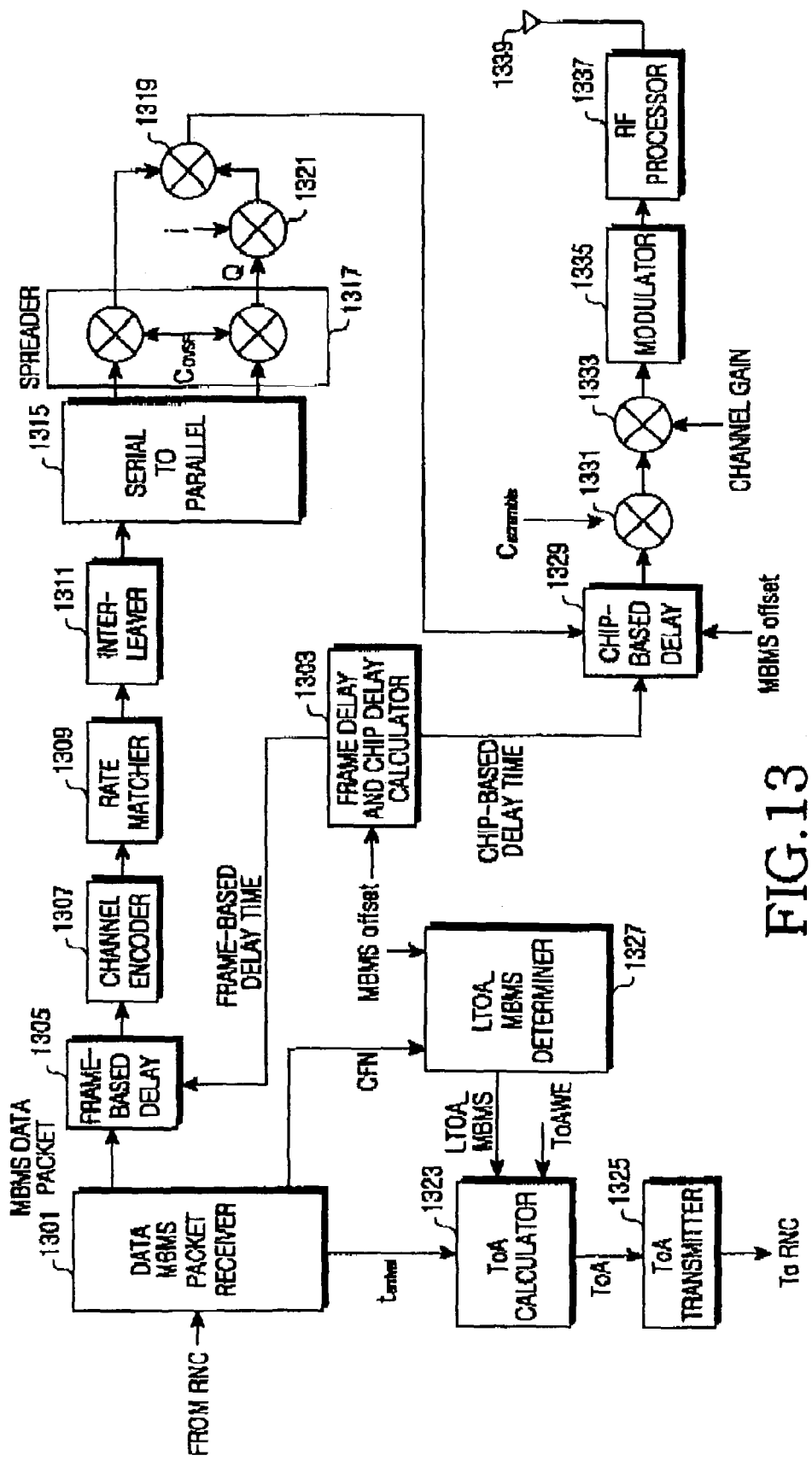
FIG. 13 illustrates a structure of a Node B transmitter in an asynchronous CDM mobile communication system according to an embodiment of the present invention.

FIG. 13 illustrates a structure of a Node B transmitter according to an embodiment of the present invention. Referring to FIG. 13, in the Node B, an MBMS data packet receiver 1301 receives MBMS data packets from an RNC. If CFN of the MBMS data packet is CFN=k, SFN of a P-CCPCH frame where transmission of the MBMS data packet is started is SFN=k+OFF and a delay time between a start point of an MBMS frame and a start point of a P-CCPCH frame must be $T_m$. In this case, the OFF and $T_m$ are calculated by a frame delay and chip delay calculator 1303 based on MBMS offset information in accordance with Equation (24) and Equation (25) below.

OFF=⌊MBMS offset/38400⌋  Equation (24)

$T_m$=MBMS offsetOFF×38400  Equation (25)

In Equation (24), ⌊x⌋ indicates a maximum integer smaller than or equal to a particular value 'x'.

The frame delay and chip delay calculator 1303 applies a frame-based delay time of an MBMS data packet to a frame-based delay 1305 and a chip-based delay time of the MBMS data packet to a chip-based delay 1329. The frame-based delay time applied to the frame-based delay 1305 is set such that transmission of the MBMS frame can be started at SFN=k=OFF, while the chip-based delay time applied to the chip-based delay 1329 is set such that transmission of the MBMS frame can be started, $T_m$-chip time after a start point of P-CCPCH with SFN=k+OFF.

The MBMS data packet received from the RNC is applied to a channel encoder 1307 by the frame-based delay 1305, after a lapse of the calculated frame-based delay time. An output of the channel encoder 1307 is handled by a rate matcher 1309 and an interleaver 1311, and then separated into an in-phase (I) bit stream and a quadrature-phase (Q) bit stream by a serial-to-parallel (S/P) converter 1315 for generation of a complex symbol stream. The I and Q-bit stream signals are multiplied by a spreader 1317 by an orthogonal variable spreading factor (OVSF) code COVSF with a chip rate, for spreading. Of the output of the spreader 1317, the Q-bit stream signal is multiplied by a multiplier 1321 by j and converted into an imaginary signal, and the output of the multiplier 1321 is added to the I-bit stream signal by an adder 1319, generating a complex signal with a chip rate. The complex signal output from the adder 1319 is multiplied by a scrambling code $C_{SCRAMBLE}$ by a scrambler 1331, after a lapse of the chip-based delay time calculated by the chip-based delay 1329 based on P-CCPCH. An output of the scrambler 1331 is multiplied by a channel gain by a multiplier 1333, and then modulated by a modulator 1335. An output of the modulator 1335 is converted into a radio frequency (RF) signal by an RF processor 1337, and then transmitted through an antenna 1339.

In the user plane synchronization procedure, a $T_{arrival}$ value indicating an arrival time of a DL synchronization message received at the MBMS data packet receiver 1301 is provided to a ToA calculator 1323. In addition, CFN included in the DL synchronization message is provided to a LTOA_MBMS determiner 1327. The LTOA_MBMS determiner 1327 determines an LTOA_MBMS value for SFN corresponding to the received CFN based on the received CFN value and the MBMS offset received from the RNC through the NBAP message. The LTOA_MBMS value represents a maximum time when the MBMS offset should arrive in order to transmit the data at CFN+MBMS_offset. The LTOA_MBMS value is determined according to TTI (Transmission Time Interval), or basic transmission unit, of the data, and the TTI is one of 10 ms, 20 ms, 40 ms and 80 ms. That is, as the TTI is longer, the LTOA_MBMS value must be larger. The LTOA_MBMS value represents a time interval in which data with the received CFN value must previously arrive so that it can be transmitted at corresponding SFN (CFN+MBMS_offset). Thus, if the TTI is long, the data must previously arrive in order to be transmitted through the interleaver 1311 at a desired time. The interleaver 1311 interleaves data by the TTI. Thus, if the TTI is longer than 10 ms, e.g., if the TTI is 20 ms, the LTOA_MBMS value must be set to a value larger than 10 ms, considering delay of the data by the interleaver 1311 before SFN (i.e., CFN+MBMS_offset) where corresponding CFN is to be transmitted. The LTOA_MBMS value determined by the LTOA_MBMS determiner 1327 is provided to the ToA calculator 1323. The ToA calculator 1323 determines a ToA value based on the received $T_{arrival}$ value, the LTOA_MBMS value, and a ToAWE value previously received through an NBAP message. The ToA value is determined by $$i\ ToA = LTOA\_MBMS - ToAWE - T_{arrival} \qquad \text{Equation (26)}$$

The determined ToA value is transmitted to the RNC by a ToA transmitter 1325 through a UL synchronization message.

As described above, in the asynchronous mobile communication system supporting an MBMS service, when a UE moves to a region where it can receive data from a plurality of Node Bs, the present invention provides the UE with soft handover. Accordingly, even though an MBMS user moves from an existing cell to a new cell, the present invention provides a stable MBMS service, contributing to the convenience of the user. In addition, when a UE is located in a handover region, the present invention enables the UE to soft-combine data received from a plurality of Node Bs, thereby decreasing transmission power of the Node Bs. As a result, the present invention contributes to an increase in power efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting broadcast data from neighboring Node Bs to one of a plurality of user equipments (UEs) when the UE moves to a handover region between the neighboring Node Bs, in a code division multiple access (CDMA) mobile communication system having at least two neighboring Node Bs, a radio network controller (RNC) connected to the Node Bs, and the UEs located in cells occupied by corresponding Node Bs, wherein the Node Bs transmit data asynchronously and transmit common broadcast data to the UEs within the cells of the Node Bs, the method comprising the steps of:

transmitting a first difference between a transmission start point of a first system frame from a first Node B of the neighboring Node Bs and a reception start point of a second system frame corresponding to the first system frame, received from a second Node B out of the neighboring Node Bs, from the first Node B to the RNC;

transmitting a second difference between a transmission start point of the second system frame from the second Node B and a reception start point of the first system frame corresponding to the second system frame, received from the first Node B, from the second Node B to the RNC;

calculating a third difference between the transmission start points of the first and second system frames from the first and second differences by dividing a difference between the first and second differences by 2; and informing the first and second Node Bs of a transmission time point of the frames of the broadcast data according to the third difference.

2. The method of claim 1, wherein the first system frame is a frame transmitted over a common pilot channel (CPICH) from the first Node B.

3. The method of claim 1, wherein the second system frame is a frame transmitted over CPICH from the second Node B.

4. The method of claim 1, wherein the transmission start point of the first system frame is a system frame number of the first Node B at a time point where the first Node B starts transmission of the first system frame.

5. The method of claim 4, wherein the reception start point of the second system frame is a system frame number of the first Node B at a time point where the first Node B starts reception of the second system frame.

6. The method of claim 1, wherein the transmission start point of the second system frame is a system frame number of the second Node B at a time point where the second Node B starts transmission of the second system frame.

7. The method of claim 6, wherein the reception start point of the first system frame is a system frame number of the second Node B at a time point where the second Node B starts reception of the first system frame.

8. The method of claim 1, wherein an offset for designating a time point where the second Node B is to transmit the frames of the broadcast data is calculated by summing up a frame-based difference between the transmission start points of the first and second Node Bs, a difference between the transmission start points of the first and second system frames, and a connection frame number of a transmission point of the first Node B.

9. The method of claim 1, wherein the reception start point of the second system frame is a reception start point nearest to the transmission start point of the first system frame among reception start points of the second system frames received from the second Node B.

10. The method of claim 1, wherein the reception start point of the first system frame is a reception start point nearest to the transmission start point of the second system frame among reception points of the first system frames received from the first Node B.

11. A method for transmitting broadcast data from neighboring Node Bs to one of a plurality of user equipments (UEs) when the UE moves to a handover region between the neighboring Node Bs, in a code division multiple access (CDMA) mobile communication system having at least two neighboring Node Bs, a radio network controller (RNC) connected to the Node Bs, and the UEs located in cells occupied by corresponding Node Bs, wherein the Node Bs transmit data asynchronously and transmit common broadcast data to the UEs within the cells of the Node Bs, the method comprising the steps of:

transmitting a difference between a transmission start point of a first system frame from a first Node B of the neighboring Node Bs and a transmission start point of a second system frame from a second Node B of the neighboring Node Bs, from a UE located in a handover region to the RNC;

multiplying a particular integer among integers between 0 and 255 by a total number of chips constituting one system frame number, adding the multiplied result and a particular integer among integers between 0 and 38399, and transmitting the added result as a first offset for determining a transmission start point of a frame of a broadcast data by the RNC; and adding a difference between the start points and the first offset, and transmitting the added result as a second offset for enabling the second Node B to transmit the frames of the broadcast data at a same time as the first Node B.

12. The method of claim 11, wherein the difference between the start points is calculated by multiplying a difference between a system frame number of a first system frame from the first Node B of the neighboring Node Bs within an effective area and a system frame number of a second system frame from the second Node B of the neighboring Node Bs, by a total number of chips constituting one system frame number, and then adding the multiplied result and a difference between a reception start point of the first system frame and a reception start point of the second system frame nearest to the reception start point of the first system frame.

13. The method of claim 11, wherein the UE transmits reception power information of the first and second system frames to the RNC.

14. The method of claim 1, wherein the first system frame is a frame transmitted over a common pilot channel (CPICH) from the first Node B.

15. The method of claim 12, wherein the second system frame is a frame transmitted over a common pilot channel CPICH from the second Node B.

16. The method of claim 11, wherein the transmission start point of the first system frame is a system frame number at a time point where the first Node B starts transmission of the first system frame.

17. The method of claim 16, wherein the transmission start point of the second system frame is a system frame number at a time point where the second Node B starts transmission of the second system frame.

18. The method of claim 11, wherein the difference between the start points is calculated by a time point where a second system frame nearest to the first system frame among second system frames received from the second Node B is transmitted from the second Node B.

19. A method for transmitting broadcast data from neighboring Node Bs to one of a plurality of user equipments (UEs) when the UE moves to a handover region between the neighboring Node Bs, in a code division multiple access (CDMA) mobile communication system having at least two neighboring Node Bs, a radio network controller (RNC) connected to the Node Bs, and the UEs located in cells occupied by corresponding Node Bs, wherein the Node Bs transmit data asynchronously and transmit common broadcast data to the UEs within the cells of the Node Bs, the method comprising the steps of:

requesting, by the RNC, the neighboring Node Bs to report an inter-system frame number observed time difference with a counterpart Node B to the neighboring Node Bs, the inter-system frame number observed time difference being calculated by multiplying a difference between a system frame number of a first system frame from a first Node B of the neighboring Node Bs within an effective area and a system frame number of a second system frame from the second Node B of the neighboring Node Bs, by a total number of chips constituting one system frame number, and then adding the multiplied result and a difference between a reception start point of the first system frame and a reception start point of the second system frame nearest to the reception start point of the first system frame;

reporting, by each neighboring Node B, to the RNC a difference between a transmission start point of a first system frame and a reception start point of a second system frame corresponding to the first system frame, received from the counterpart Node B;

determining, by the RNC, a transmission time offset of each of the neighboring Node Bs so that the neighboring Node Bs can transmit frames of the broadcast data at a same time, based on the difference values reported from the neighboring Node Bs, and then transmitting the determined transmission time offsets to the corresponding neighboring Node Bs; and transmitting, by each neighboring Node B, frames of the broadcast data at a transmission time to which the offset provided from the RNC is applied.

20. The method of claim 19, wherein the RNC transmits the determined transmission time offsets to a UE located in the handover region.

21. The method of claim 19, wherein the first and second system frames are frames transmitted over a common pilot channel (CPICH) from the first and second Node Bs, respectively.

22. The method of claim 19, wherein the transmission and reception start points of the first system frame and the transmission and reception start points of the second system frame are determined by system frame numbers.

23. The method of claim 19, wherein the reception start point of the second system frame is a reception start point nearest to the transmission start point of the first system frame among reception start points of the second system frames received from the second Node B.

24. A method for transmitting broadcast data from neighboring Node Bs to one of a plurality of user equipments (UEs) when the UE moves to a handover region between the neighboring Node Bs, in a code division multiple access (CDMA) mobile communication system having at least two neighboring Node Bs, a radio network controller (RNC) connected to the Node Bs, and the UEs located in cells occupied by corresponding Node Bs, wherein the Node Bs transmit data asynchronously and transmit common broadcast data to the UEs within the cells of the Node Bs, the method comprising the steps of:

requesting, by the RNC, a UE located in the handover region to report an inter-system frame number observed time difference between the neighboring Node Bs;

receiving, by the UE, system frames from the neighboring Node Bs, measuring an inter-system frame number observed time difference based on a time point where the system frames were transmitted from the neighboring Node Bs, and reporting the measured result to the RNC, the inter-system frame number observed time difference being calculated by multiplying a difference between a system frame number of a first system frame from a first Node B of the neighboring Node Bs within an effective area and a system frame number of a second system frame from the second Node B of the neighboring Node Bs, by a total number of chips constituting one system frame number, and then adding the multiplied result and a difference between a reception start point of the first system frame and a reception start point of the second system frame nearest to the reception start point of the first system frame;

determining, by the RNC, a transmission time offset of each of the neighboring Node Bs so that the neighboring Node Bs can transmit frames of the broadcast data at a same time, based on the inter-system frame number observed time difference reported from the UE, and then transmitting the determined transmission time offsets to corresponding neighboring Node Bs; and transmitting, by each neighboring Node B, the frames of the broadcast data at a transmission time to which the offset provided from the RNC is applied.

25. The method of claim 24, wherein the RNC transmits the determined transmission time offsets to a UE located in the handover region.

26. The method of claim 24, wherein the step of determining the transmission time offsets comprises the steps of:

determining a first transmission time offset for the first Node B by multiplying a particular integer among integers between 0 and 255 by a total number of chips constituting one system frame number and then adding the multiplied result and a particular integer among integers between 0 and 38399; and determining a second transmission time offset for the second Node B by adding the inter-system frame number observed time difference and the first transmission time offset value for the first Node B.

* * * * *